United States Patent [19]

Wong et al.

[11] Patent Number: 5,056,054
[45] Date of Patent: Oct. 8, 1991

[54] DIGITAL PHASE LOCKED LOOP UTILIZING A MULTI-BIT PHASE ERROR INPUT FOR CONTROL OF A STEPPED CLOCK GENERATOR

[75] Inventors: Hee Wong, San Jose; Howard Wilson, Santa Clara, both of Calif.; Jesus Guinea, Verdellino, Italy

[73] Assignee: National Semiconductor Corporation, Santa Clara, Calif.

[21] Appl. No.: 518,029

[22] Filed: May 2, 1990

[51] Int. Cl.[5] .................. G06F 15/31; H03K 7/08; H03D 3/24
[52] U.S. Cl. .................. 364/724.01; 375/120; 375/22
[58] Field of Search .................. 364/724.01, 825, 829; 375/22, 118, 119, 120, 21

[56] References Cited

U.S. PATENT DOCUMENTS 4,689,802 8/1987 McCambridge .................. 375/22
4,700,360 10/1987 Visser .................. 375/22

Primary Examiner—Gary V. Harkcom
Assistant Examiner—Long T. Nguyen
Attorney, Agent, or Firm—Limbach, Limbach & Sutton

[57] ABSTRACT

A digital loop filter translates a multi-bit phase error input into a high resolution control signal utilizable as an advance-retard control for a multi-phase clock generator. The digital filter couples the multi-bit phase error input to the clock generator via a pulse density modulation (PDM) accumulator, providing multi-phase adjustment in a single sample clock cycle based on the overflow or underflow of the PDM accumulator. Variable PDM cycles are used to control loop filter bandwidth, permitting adjustable capture sequences. Thus, real proportional control of the multi-phase clock generator is limited only by the word size of the phase error input.

13 Claims, 14 Drawing Sheets

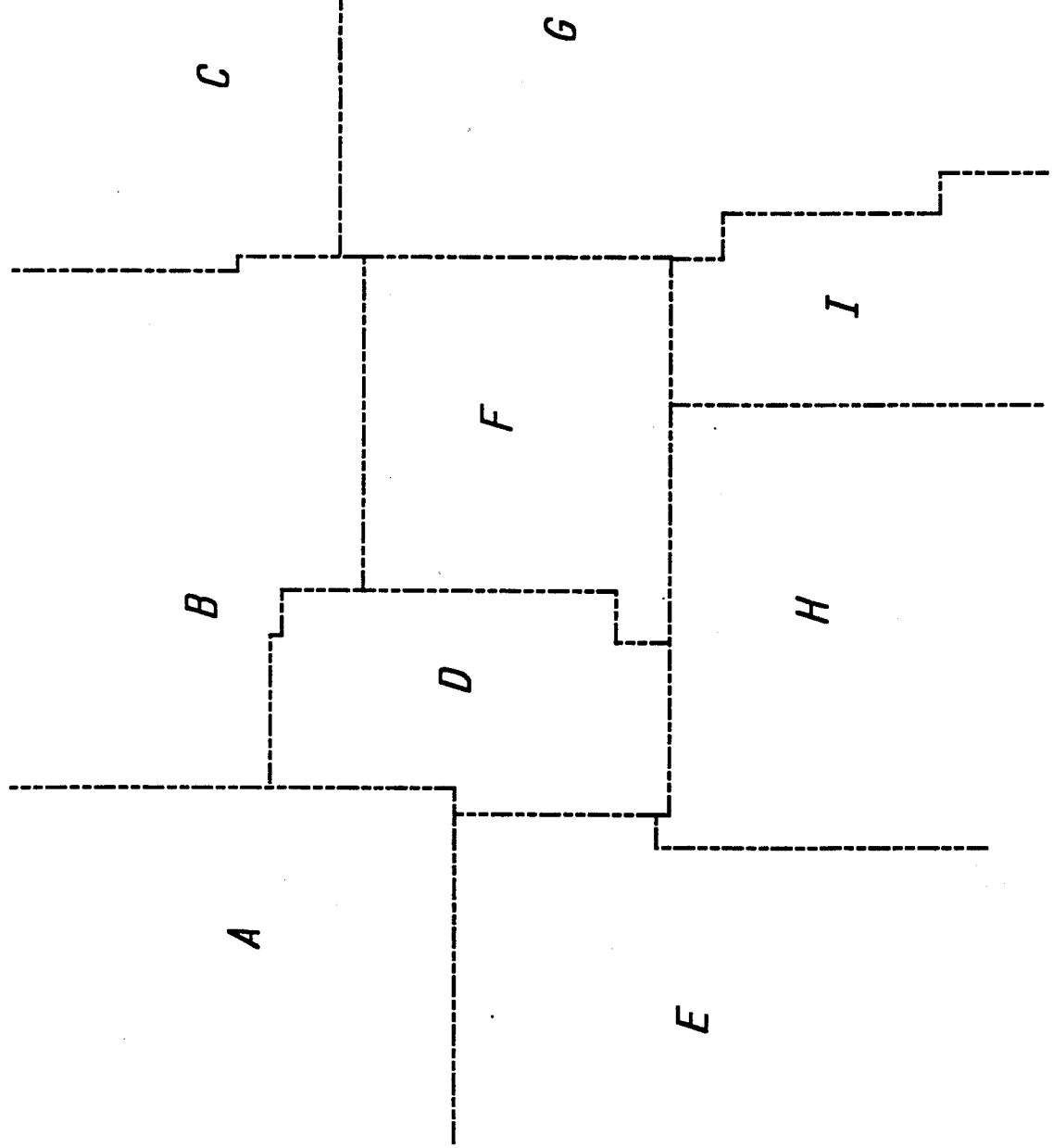

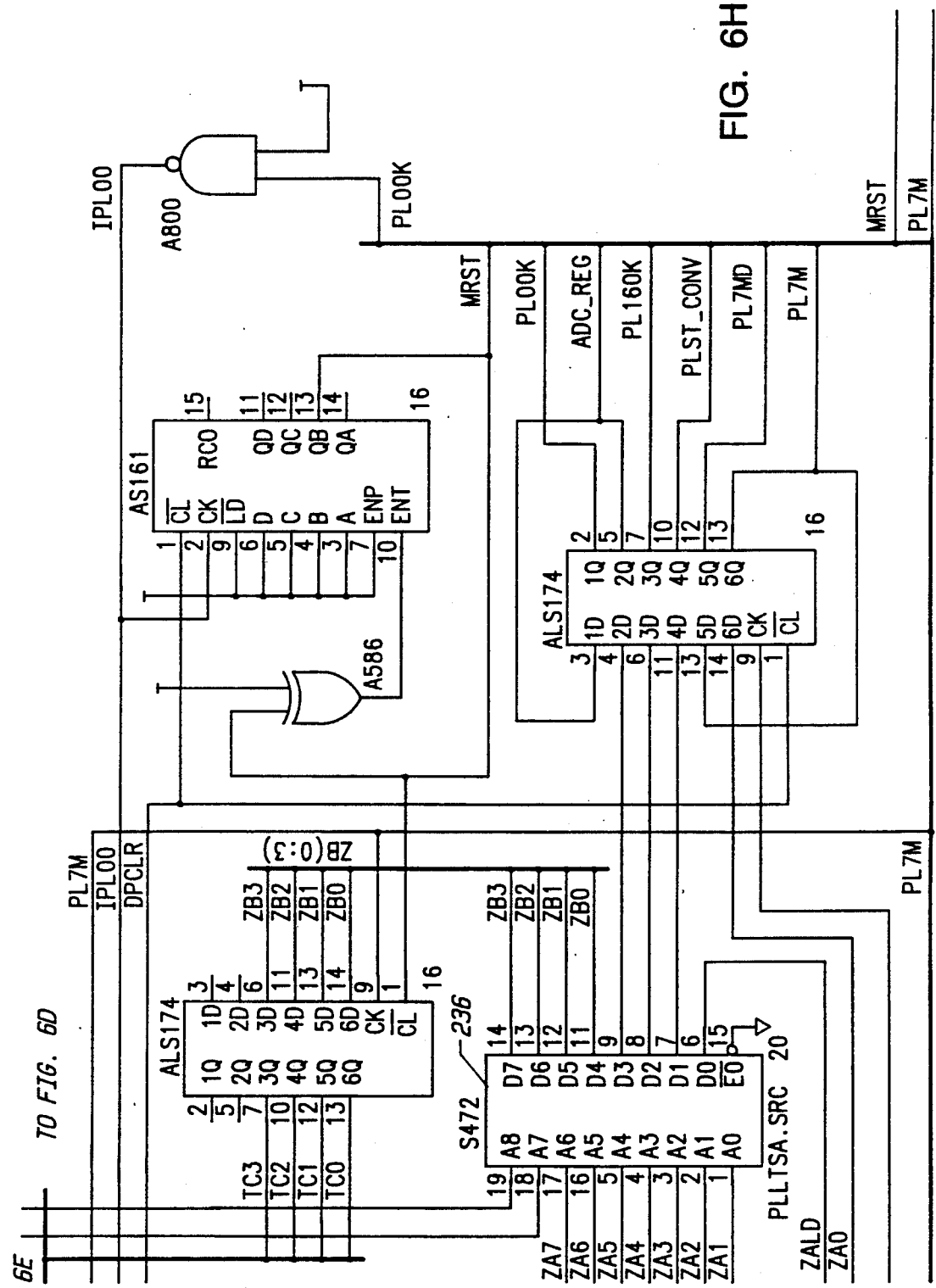

DIGITAL PHASE LOCKED LOOP UTILIZING A MULTI-BIT PHASE ERROR INPUT FOR CONTROL OF A STEPPED CLOCK GENERATOR

COPYRIGHT NOTICE

Portions of the disclosure of this patent document, in particular Appendices A-F, contain unpublished material which is subject to copyright protection. The copyright owner, National Semiconductor Corporation, has no objection to the facsimile reproduction by anyone of the patent document or the patent disclosure, as it appears in the U.S. Patent and Trademark Office patent files or records, but otherwise reserves all rights whatsoever.

BACKGROUND OF THE INVENTION

1. Field of the Invention

The present invention relates to phase locked loop systems and, in particular, to a pulse density modulation technique for translating a multi-bit phase error input into a high resolution control signal for a stepped multiphase clock generator.

2. Discussion of the Prior Art

A phase locked loop (PLL) is a frequency-selective feedback system which synchronizes with an input signal and then tracks changes in input signal frequency.

As shown in the FIG. 1, a basic analog PLL 10 includes three primary elements: a phase detector, a loop filter with some gain, and a voltage controlled oscillator (VCO).

The frequency of the input signal to the PLL 10 has an instantaneous phase $\phi_i(s)$. The instantaneous phase of the VCO output frequency is $\phi_o(s)$. The input and output phases are compared by the phase detector to provide a phase error $\phi_e(s)$.

The phase error $\phi_e(s)$ can be expressed in Laplace notation as $$\phi_e(s) = \frac{\phi_i(s)}{M} - \frac{\phi_o(s)}{N}$$

$$V_d(S) = K_d \phi_e(S)$$

where $K_d$ (volts per radian) is the gain constant of the phase detector.

The output voltage of the phase detector is filtered by the loop filter utilizing a loop transfer function F(s) which rejects out-of-band noise and high-frequency signal components. The output voltage of the loop filter is given by $$V_2(s) = V_d(s)F(s)$$
$$= K_d F(s)\phi_e(s)$$

The corresponding change in the output frequency of the VCO is $$\Delta W = K_2 V_2(s)$$

where $K_2$ (radians per second per volt) is the gain constant of the VCO.

Since $$\Delta W = d\phi_o(s)/dt = s\phi_2(s)$$

$$\phi_o(s) = \frac{K_o F(s)}{s}$$

Combining the above equations provides the basic loop transfer function $$\frac{\phi_o(s)}{\phi_i(s)} = H(s) = \frac{K_o F(s)}{s + K_o F(s)}$$
$$= \frac{KF(s)}{s + KF(s)}$$

where $K = K_2 K_d$. Also, as stated above $$\phi_e(s) = \phi_i(s) - \phi_o(s)$$

Therefore, $$\frac{\phi_e(s)}{\phi_i(s)} = 1 \cdot \frac{s}{s + KF(s)}$$

The PLL 10 behaves like any feedback system. For proper operation of the loop 10, three parameters must be chosen independently, depending upon the application: (1) the natural frequency $W_n$ of the loop, (2) a damping factor $\zeta$, and (3) the DC loop gain $K_v = KF(o)$, where F(o) is the DC gain of the loop filter 14.

For a basic first-order PLL, the loop filter is omitted. Thus, F(S) = 1 and the basic loop transfer function becomes $$H(s) = \frac{K}{s + k}$$

Since the only variable in a first-order loop is $K_v = K$, the usefulness of a first-order loop is very limited.

In many applications, it is desirable to utilize a second-order loop filter configured as shown in FIG. 2, which illustrates an active filter using an operational amplifier. For this configuration, the loop transfer function becomes $$H(s) = \frac{2\zeta W_n s}{s^2 + 2\zeta W_n s + W_n^2}$$

where $$W_n^2 = \frac{K}{T_i}$$

$$\zeta = \frac{T_2}{2} W_n (T_1 = CR_1; T_2 = CR_2)$$

The active filter transfer function is given by $$F(s) = \frac{ST_2 + 1}{ST_1} = \frac{T_2}{T_1} + \frac{1}{ST_1} = \frac{R_2}{R_1} + \frac{1}{SCR_1}$$

This is referred to as a proportional-plus-integral control, since the transfer function F(s) comprises the sum of a term which is proportional to the phase error and a term which represents the integration or accumulation of the phase error over time.

As shown in FIG. 3, the transfer function F(s) may be realized by two active filters operating in parallel, one for the proportional term $R_2/R_1$ and one for the integral term $1/SCR_1$. The proportional and integral terms are then added to provide the control signal for the VCO 16.

Both of these latter configurations permit independent choice of $W_n$, $\zeta$, and $K_v$, and are widely used in practical PLL designs. The active filter has the added advantage that the presence of the amplifier makes the DC loop gain $K_v$ very high compared to that obtainable with the passive configuration. The active second-order loop filter is, therefore, the most attractive choice for most applications.

A digital PLL (DPLL) is a discrete time version of the above-described analog PLL. In a DPLL, the phase error is sampled and quantized in an analog-to-digital (A/D) converter and then processed in a digital discrete time filter. The discrete output of the filter is converted into analog samples by a digital/analog converter and then held in a zero-order hold circuit the output of which controls the VCO.

A simpler type of digital PLL, sometimes referred to as a digital phase synchronizer, can be used to provide a stepping signal for advancing or retarding a multi-phase clock generator or digitally controlled clock. In this type of PLL, the sign of the discrete phase error value generated by the A/D converter determines whether the control output of the PLL will advance or retard the stepped clock generator. That is, if during a cycle of the sample clock generated by the clock generator, the input phase advances relative to the phase of the sample clock, then an advance signal is provided to the clock generator to cause a forward phase jump. Conversely, if the input phase lags relative to the phase of the sample clock output of the clock generator, then a retard signal is provided to cause a backward phase jump.

A major problem associated with this so-called "bang-bang" approach to phase clock control is that the single-bit sign value utilized to drive the advance/retard signal can only implement single-phase movement of the clock generator in a given cycle of the sample clock and, therefore, does not provide the fine resolution required in high speed data recovery applications.

SUMMARY OF THE INVENTION

The present invention provides a pulse density modulation (PDM) accumulator, second-order loop filter system that translates a multi-bit phase error input to a high resolution control signal utilizable as an advance/retard control for a multi-phase clock generator (or stepped digitally controlled clock). That is, a digital loop filter couples the multi-bit phase error input to the stepped clock generator via a PDM accumulator, thus providing for multi-phase adjustment of the clock generator within a single cycle of the sample clock output. Variable PDM cycles are used to control loop bandwidth, permitting a high speed initial capture sequence which then can be slowed down as the loop locks on the incoming signal. Use of a digital integrator allows the selection of a large number of discrete values of frequency that will not change, as in conventional RC integrators, due to charge leakage. This allows tracking and retransmission of incoming data using a low cost reference crystal. Real proportional control of the clock generator is limited only by the word size of the phase error input.

A PDM accumulator second-order loop filter system in accordance with the present invention comprises a proportional accumulator responsive to the multi-bit phase error input signal for generating a multi-bit proportional term, an integrator accumulator responsive to the proportional term for iteratively accumulating the proportional term to provide an integral term, integrator-plus-proportional means for summing the proportional term and the integral term to provide a multi-bit integrator-plus-proportional term, and a PDM accumulator for accumulating the multi-bit integrator-plus-proportional term to provide a PDM accumulator control signal indicative of both the number of phase jumps to be taken by a stepped clock generator responsive to the PDM control signal and the direction of the phase jumps.

A better understanding of the features and advantages of the present invention will be obtained by reference to the following detailed description and accompanying drawings which set forth an illustrative embodiment in which the principles of the invention are utilized.

BRIEF DESCRIPTION OF THE DRAWINGS

FIG. 6 is a map for FIGS. 6A-6I.

FIGS. 6A-6I combine to provide a schematic diagram illustrating a circuit embodiment of a PDM accumulator, second-order loop filter system in accordance with the present invention.

DETAILED DESCRIPTION OF THE INVENTION

Figure 4:
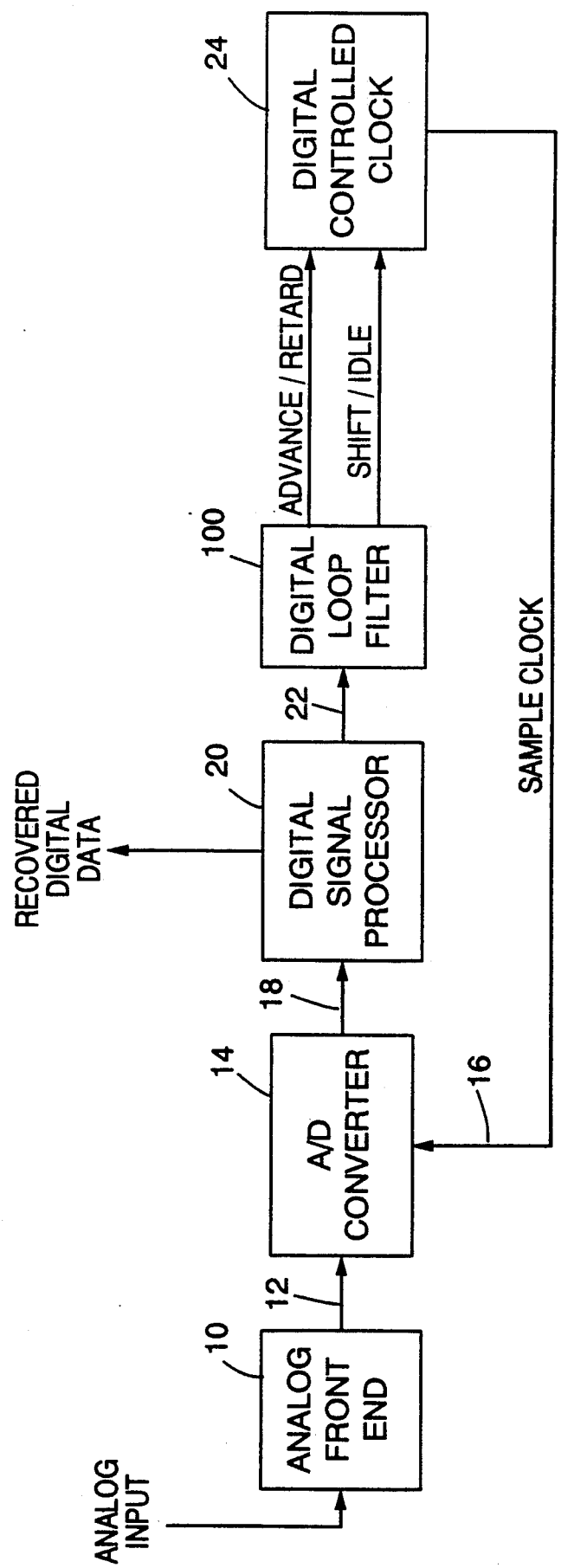
FIG. 4 is a block diagram illustrating a receiver system that utilizes a PDM accumulator, second-order loop filter system in accordance with the present invention to recover digital data from an analog input signal.

FIG. 4 shows a simple block diagram of a receiver system for recovering digital data from an analog input signal.

As shown in FIG. 4, an incoming analog modulated carrier waveform received from a communications channel is first processed by a analog front end 10 in the conventional manner; this initial processing typically includes prefiltering of the received signal and automatic gain control. The output signal 12 of the analog front end 10 is then provided to an analog-to-digital (A10) converter 14. The A/D converter 14 relies on a sample clock signal 16 to recover a digitized replica 18 of the analog input signal from the output of the analog front end 10. This digitized replica 18 is then processed by a digital signal processor (DSP) 20 in accordance with a dedicated DSP algorithm to recover the incoming digital data. The DSP 20 also generates a multi-bit phase error signal 22 which is representative of the phase difference between the incoming signal and the current sample clock output 16 of a multi-phase clock generator or digitally controlled clock 24.

As stated above in the Background of the Invention section of this patent document, in a conventional digital phase locked loop, the sign of the digital phase error signal 22, i.e. a single bit signal, is utilized to either advance or retard the phase of the sample clock 16 provided by the multi-phase clock generator 24. Adjustment of the multi-phase clock generator 24 in this manner is limited to a single phase jump per cycle of the sample clock 16.

However, in accordance with the present invention, the multi-bit phase error signal 22 is provided to a pulse density modulation (PDM) accumulator, second-order digital loop filter system 100 that, as described in greater detail below, translates the multi-bit phase error signal 22 into a high resolution, control signal utilizable by the multi-phase stepped clock generator 24. The control signal provided by the PDM accumulator system 100 includes components indicative of both the number of phase jumps to be taken by the stepped clock generator 24 in a single cycle of the sample clock 16 and the direction of the phase jumps. Thus, real proportional control of the multi-phase clock generator 24 is limited only by the word size of the phase error input signal 22 to the loop filter 100.

An example of a stepped clock generator 24 which may be utilized in practicing the present invention is disclosed in copending and commonly assigned U.S. patent application Ser. No. 369,474 filed by Hee Wong et al on June 21, 1989 for a High Resolution Sample Clock Generator with Deglitcher; the just-referenced Wong et al application is hereby incorporated by reference to provide additional background information regarding the subject invention.

Figure 5:
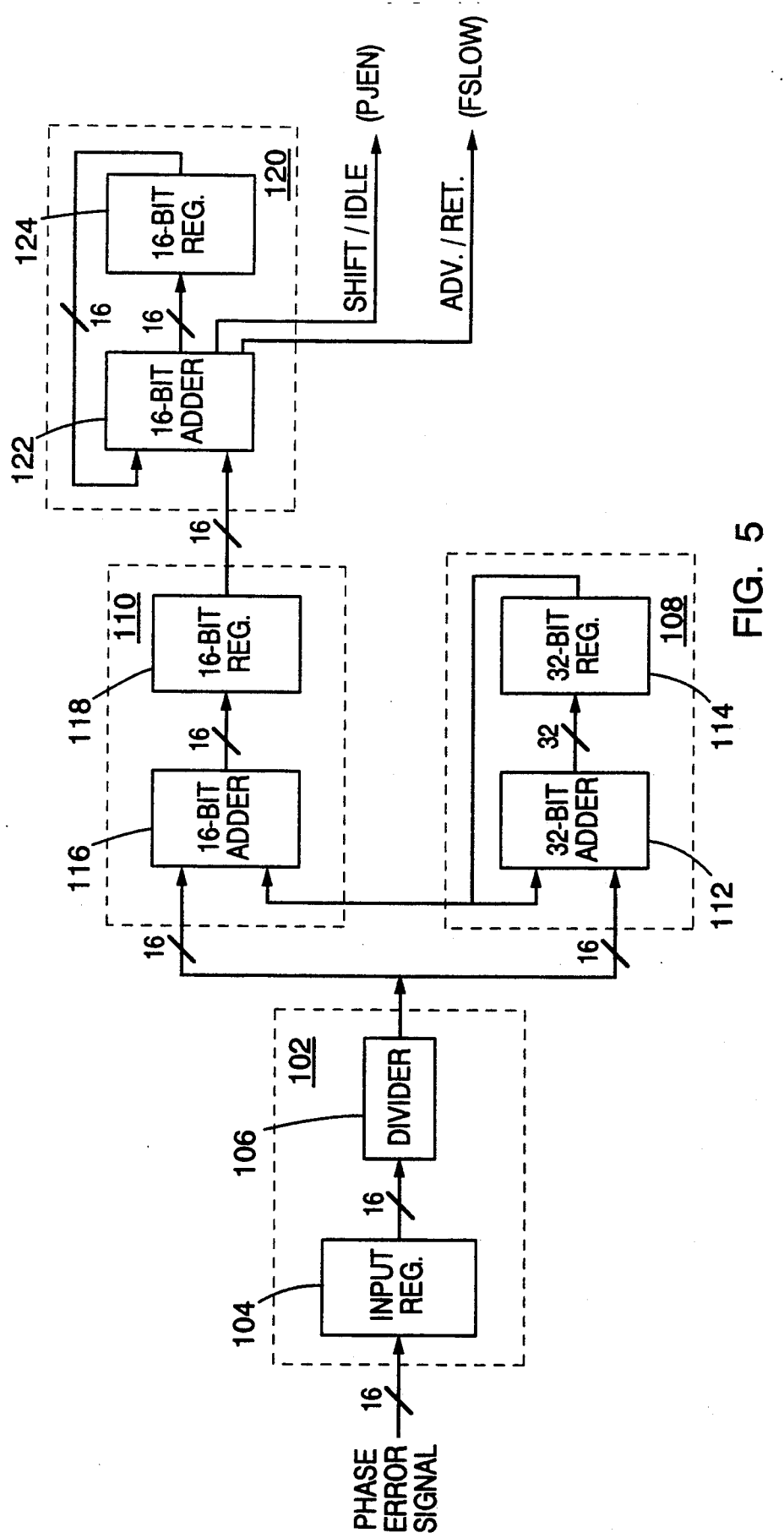
FIG. 5 is a block diagram illustrating an embodiment of a PDM accumulator, second-order loop filter system in accordance with the present invention.
Figure 6A:
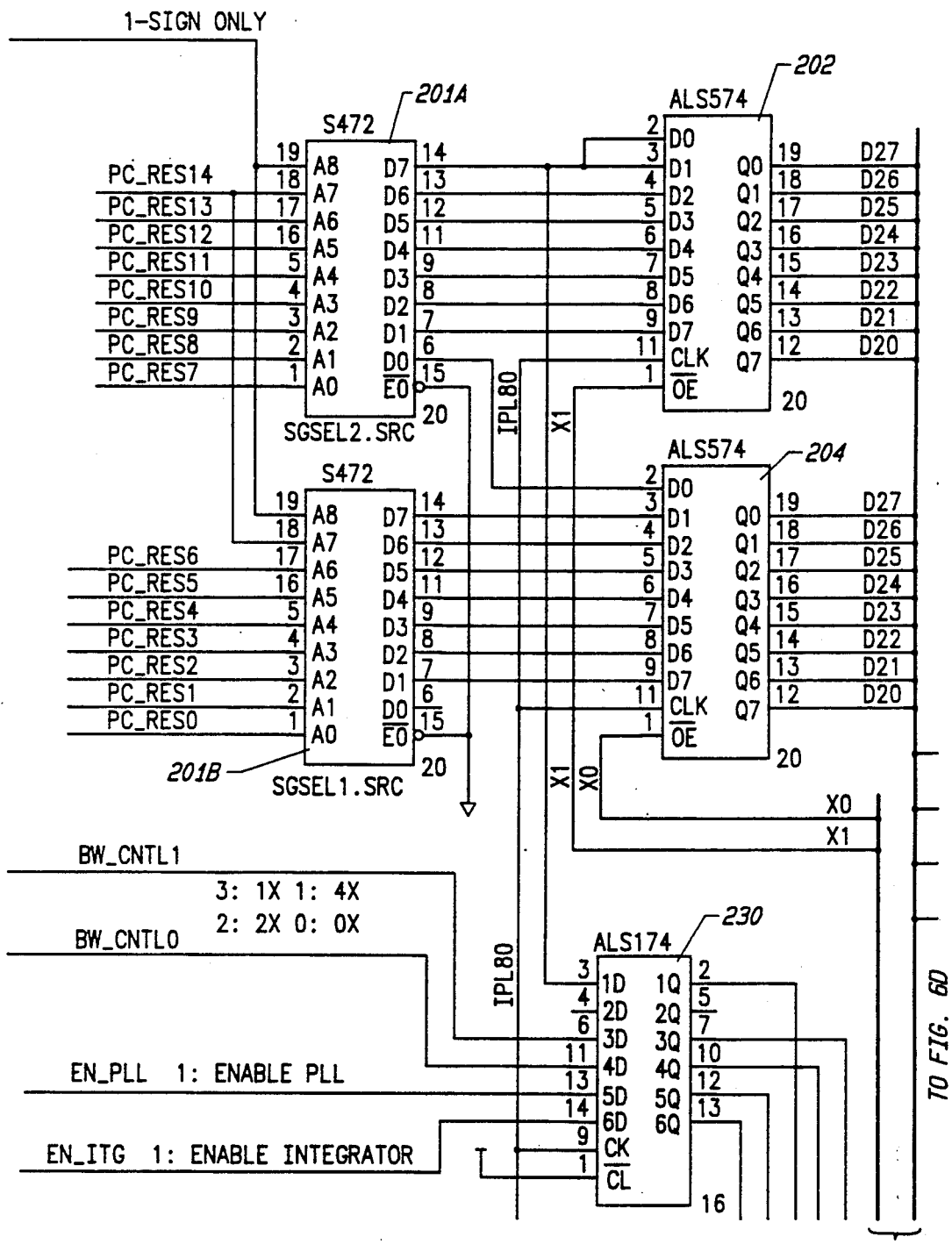
Figure 6B:
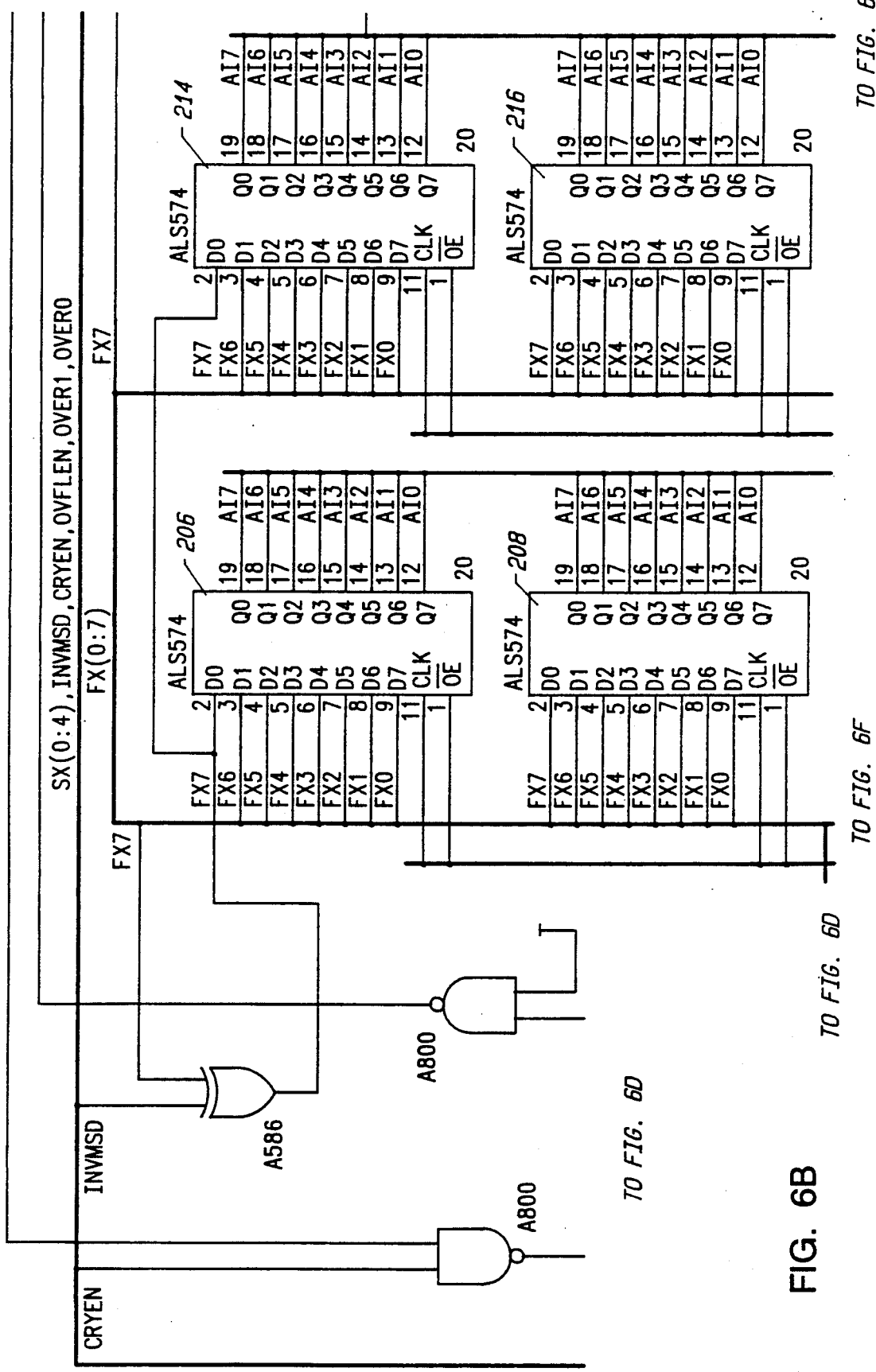
Figure 6C:
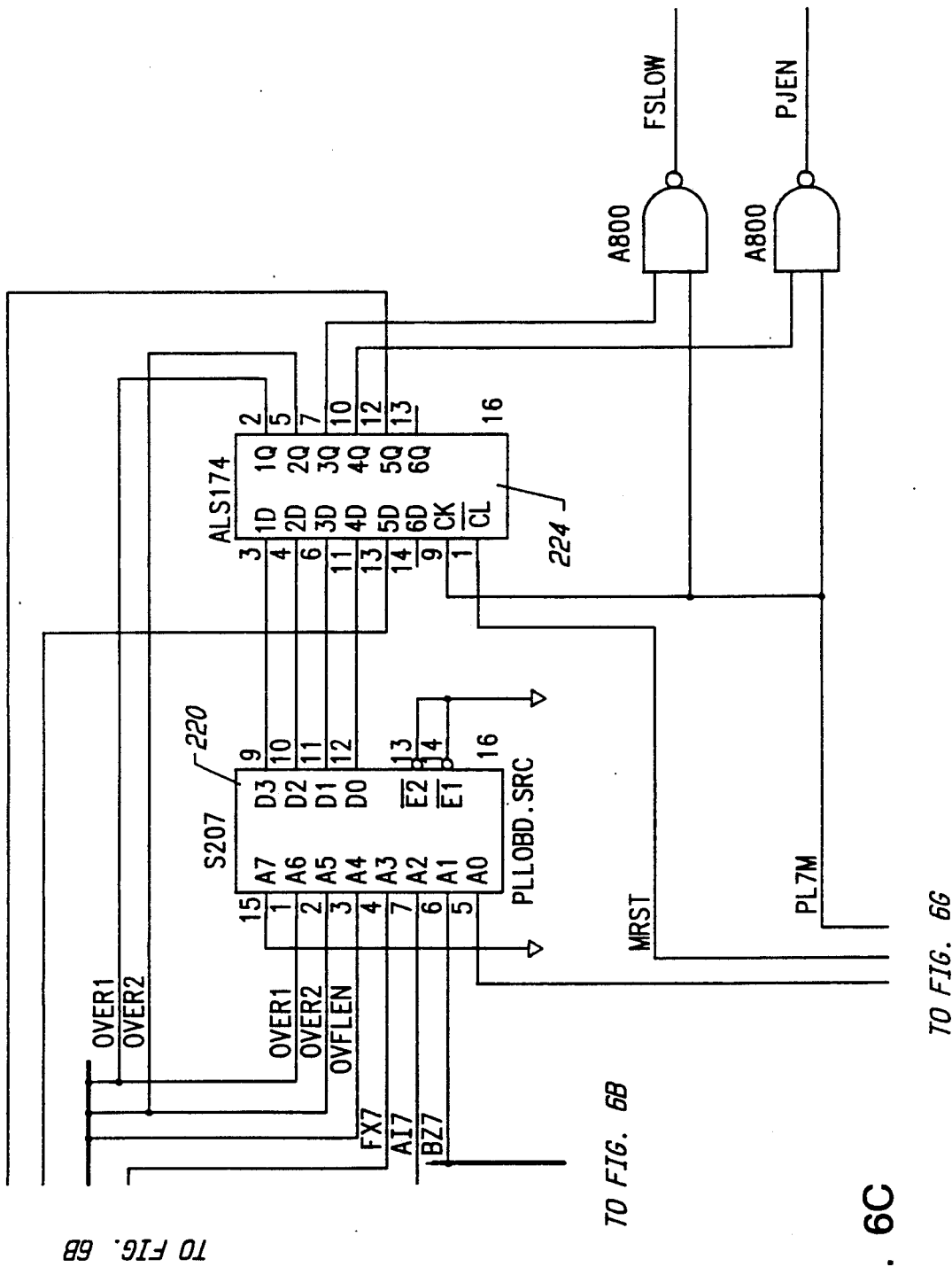
Figure 6D:
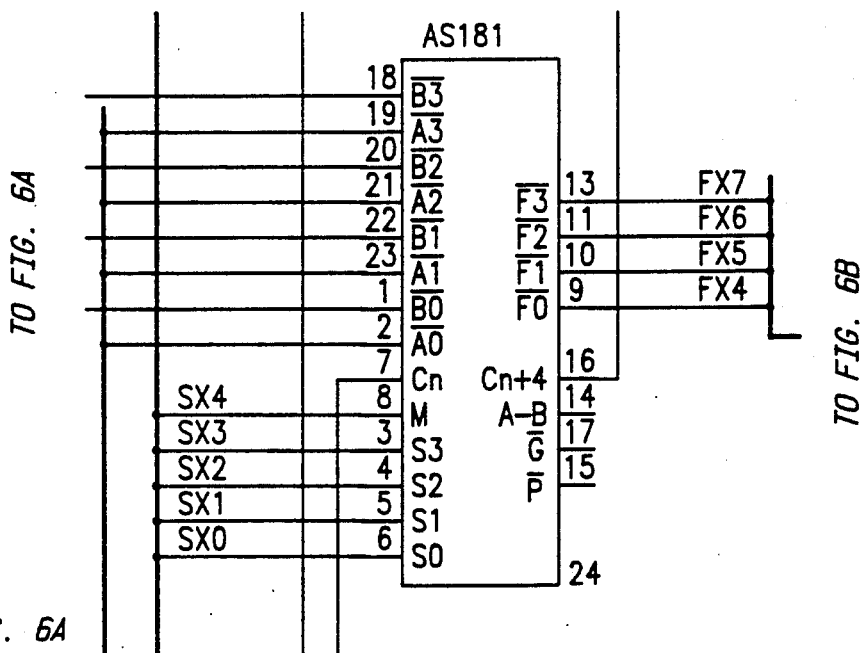
Figure 6D:
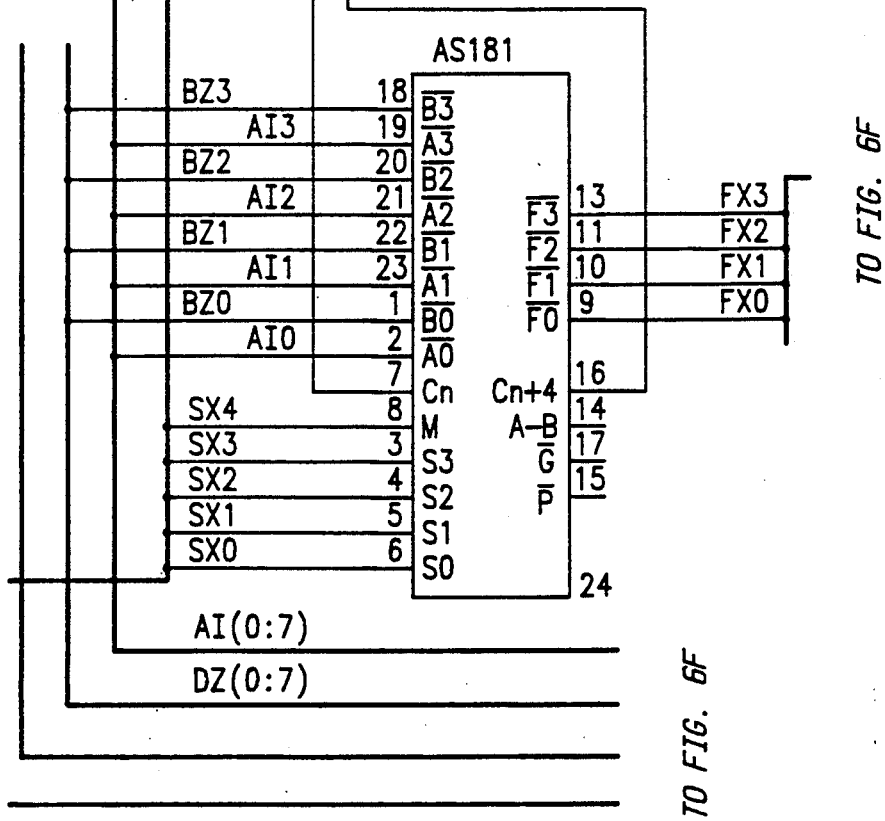
Figure 6E:
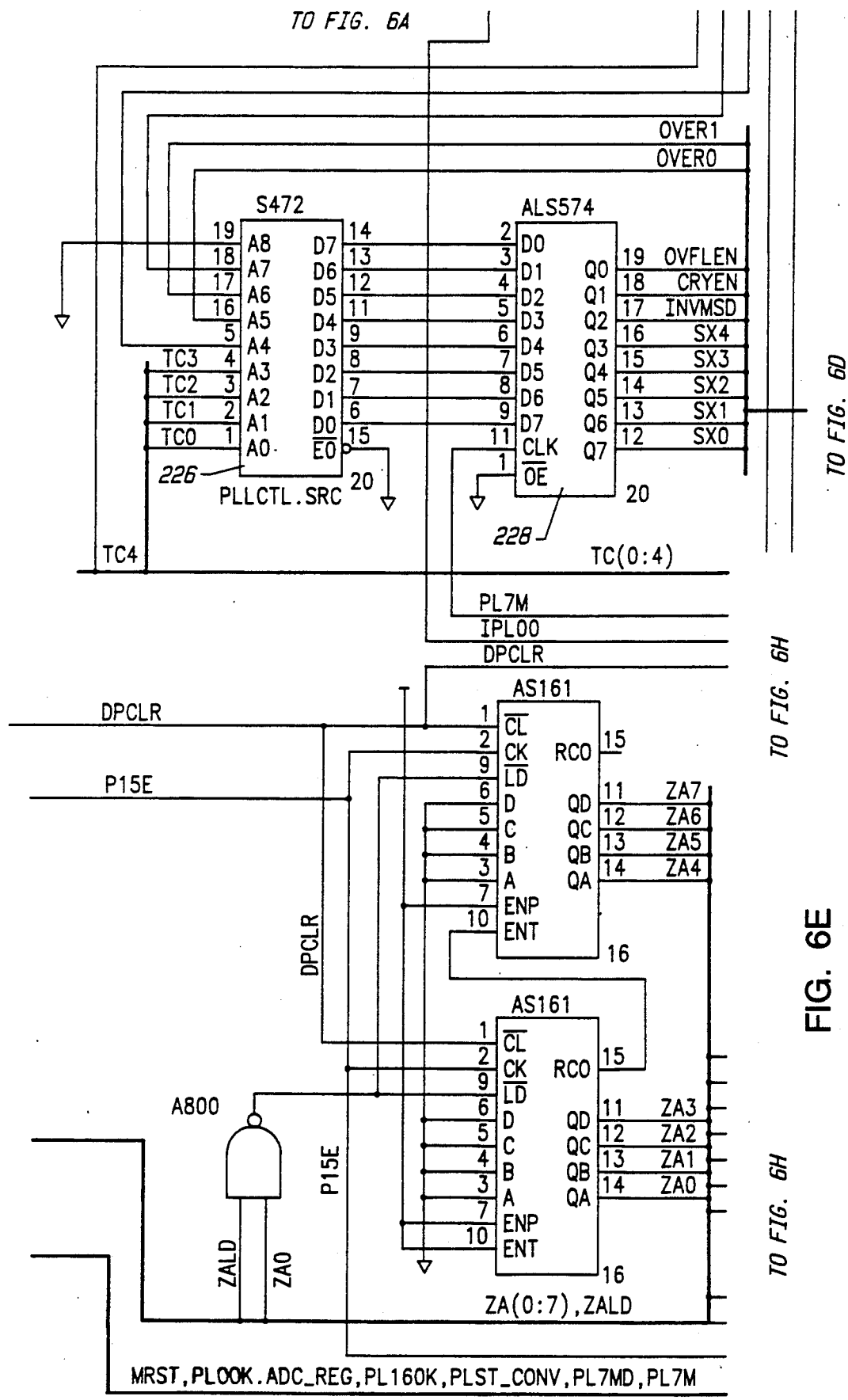
Figure 6F:
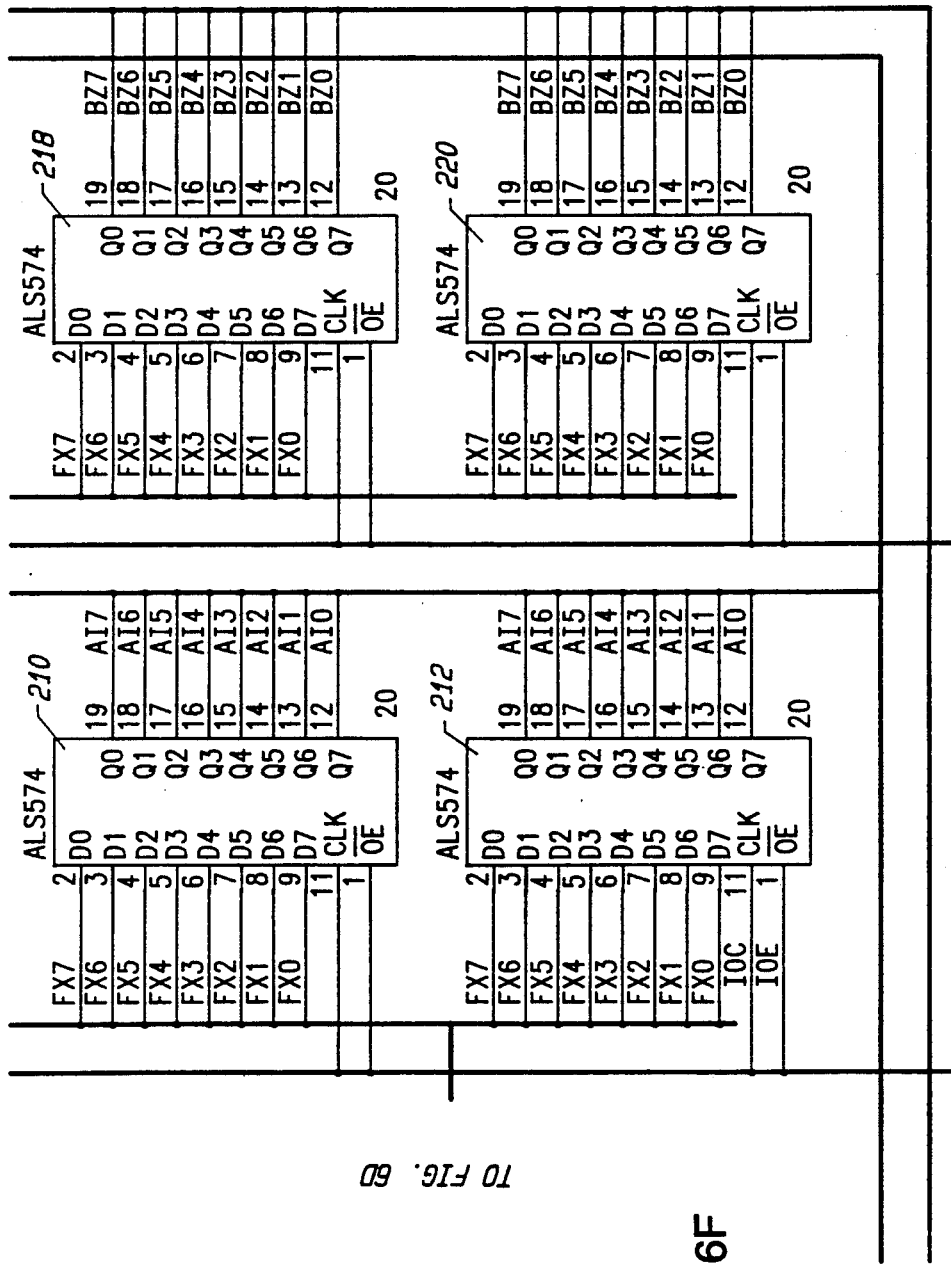
Figure 6G:
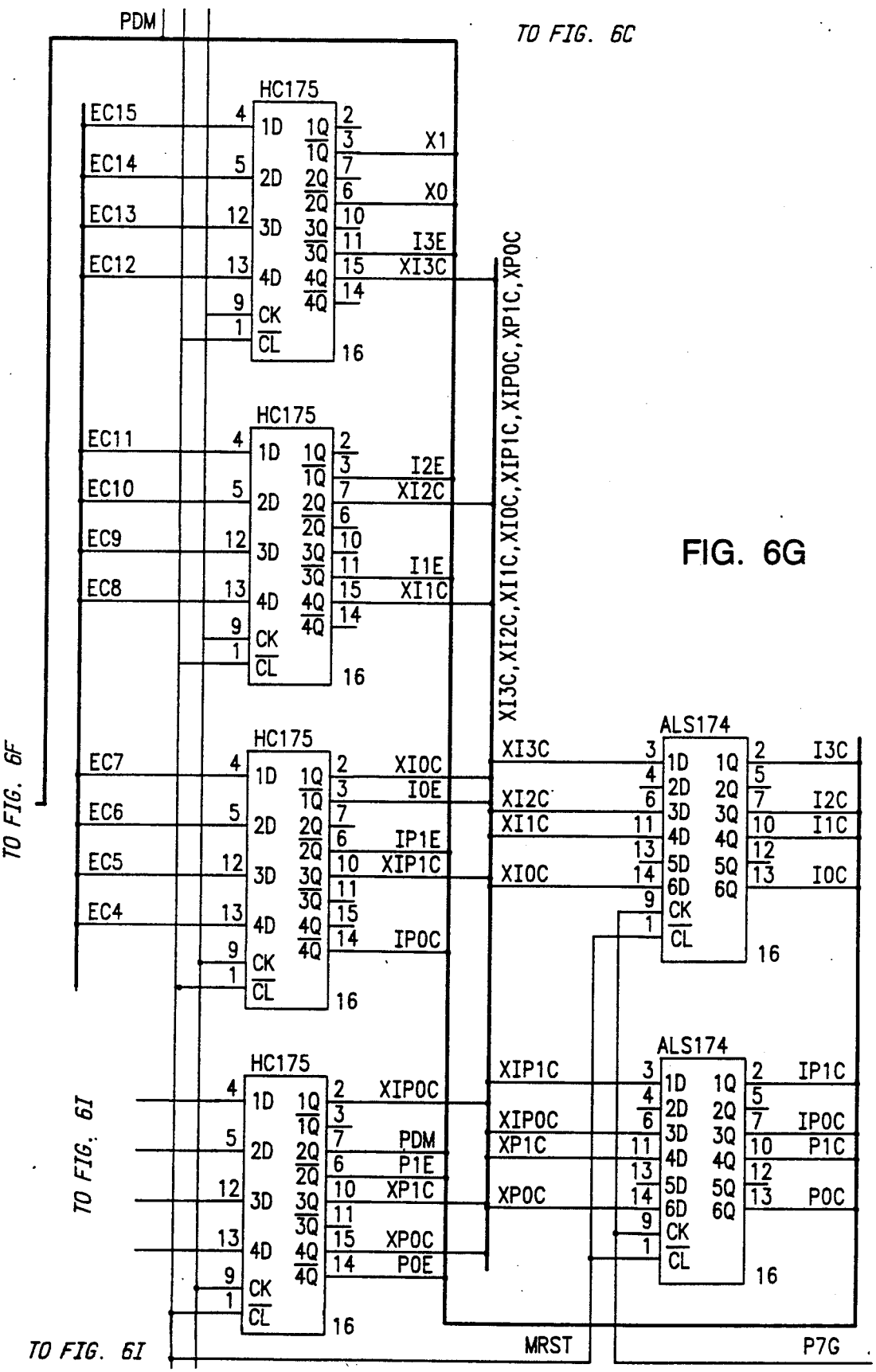
Figure 6I:
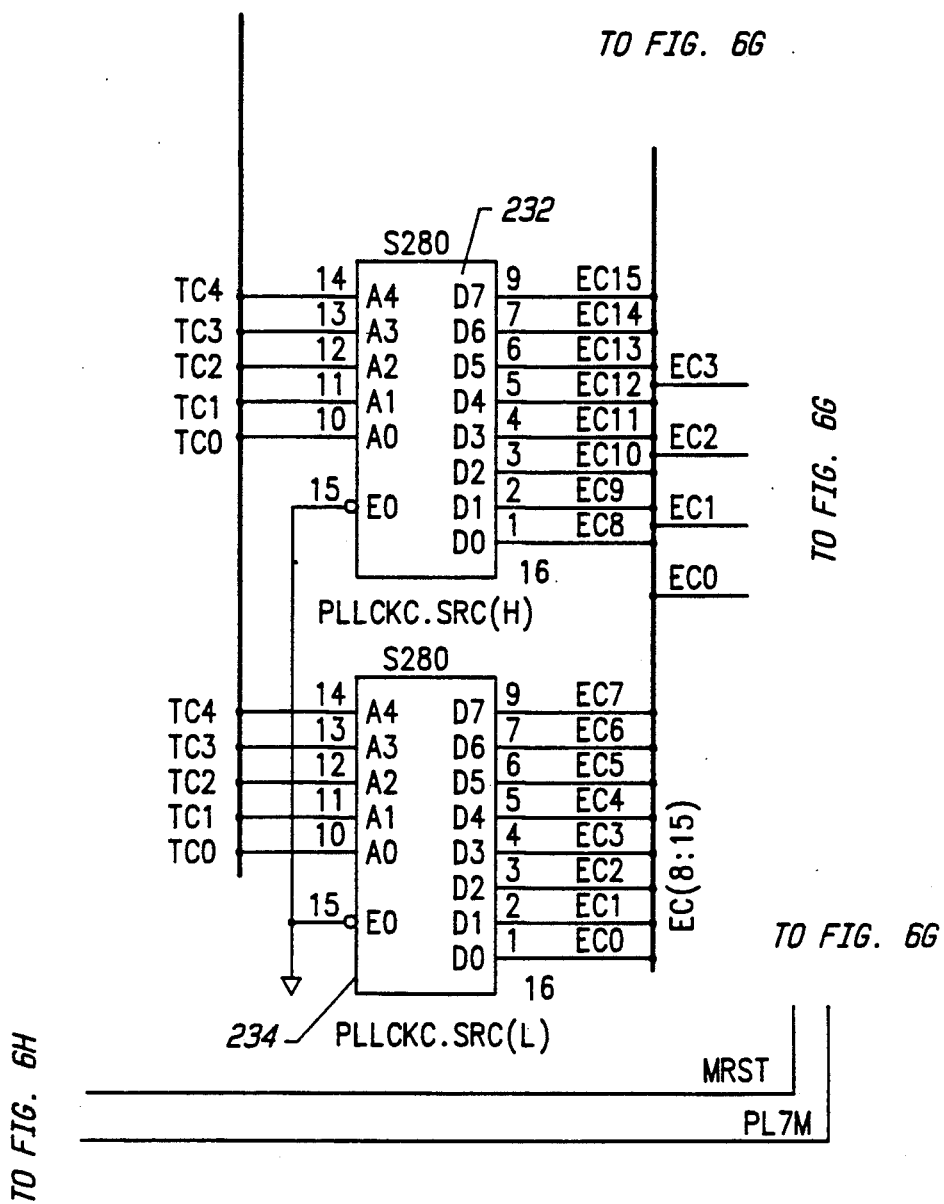

FIG. 5 shows a block diagram of a PDM accumulator, second-order loop filter system 100 in accordance with the present invention.

The system 100 shown in FIG. 5 includes a proportional accumulator 102 which receives a 16-bit phase error input signal from the DSP 20 (FIG. 4). The 16-bit phase error input signal is stabilized in an input register 104 and then divided by divider 106 to provide a 16-bit phase error term proportional to the phase error input signal. The 16-bit proportional term is provided both to an integrator accumulator 108 as well as to integrator-plus-proportional summing circuitry 110.

The integrator accumulator 108, which includes a 32-bit adder 112 and a 32-bit register 114, continually accumulates the 16-bit proportional term in the conventional manner to provide an integral term to the summing circuitry 110.

The integral-plus-proportional summing circuitry 110, which includes a 16-bit adder 116 and 16-bit register 118, receives the proportional term from the proportional filter 102 and the integral term from the integrator accumulator 108 and sums them in the conventional manner to provide a corresponding 16-bit integrator-plus-proportional term. That is, the 16-bit phase error input signal from the proportional filter 102 is provided to the 16-bit adder 116. The 16-bit adder 116 also receives the 16 most significant bits (MSB) of 32-bit output of the integrator accumulator 108. The 16-bit output of the adder 116 is allowed to stabilize in the 16-bit register 118 which then provides the 16-bit integral-plus-proportional output term to a pulse density modulation (PDM) accumulator 120.

As described in greater detail below, the PDM accumulator 120 interfaces the 16-bit integral-plus-proportional term to the multi-phase clock generator 24 (FIG. 4). The PDM accumulator 120 accumulates the integral-plus-proportional term, using a 16-bit adder 122, either 3, 6, 12 or 24 times per period of the sample clock 16 (FIG. 4), depending on a bandwidth control setting. Each time an overflow or underflow of adder 122 occurs, the multi-phase clock generator 24 is enabled via the shift/idle signal PJEN to jump one phase period. The FSLOW signal component of the output of adder 16 provides the direction of the phase jump, which depends on whether an overflow or underflow condition occurred.

It should be noted that the adder 122 does not reset when an overflow or underflow condition occurs. This allows the residue of the previous cycle to be added to the present integral-plus-proportional terms via 16-bit register 124. This further reduces the overall jitter of the sample clock output 16 provided by the multi-phase clock generator 24 (FIG. 4) by eliminating truncation errors.

Those familiar with the art will understand that, in the interests of efficiency and conserving integrated circuit die area, the PDM accumulator, second-order loop filter system 100 may be implemented utilizing an 8-bit ALU as its core, the ALU being time-multiplexed to perform the various arithmetic functions of the system 100. The control and bandwidth selection functions of the filter 100 may then be implemented utilizing conventional circuitry.

FIGS. 6A–6I combine to provide a schematic diagram of an embodiment of a PDM accumulator, second-order loop filter circuit 100 that utilizes a time-multiplexed ALU in accordance with the present invention.

The core of the circuit 100 is provided by an 8-bit arithmetic logic unit (ALU) 200, shown in FIG. 6, which performs different arithmetic functions during different groups of its cycles.

Figure 7:
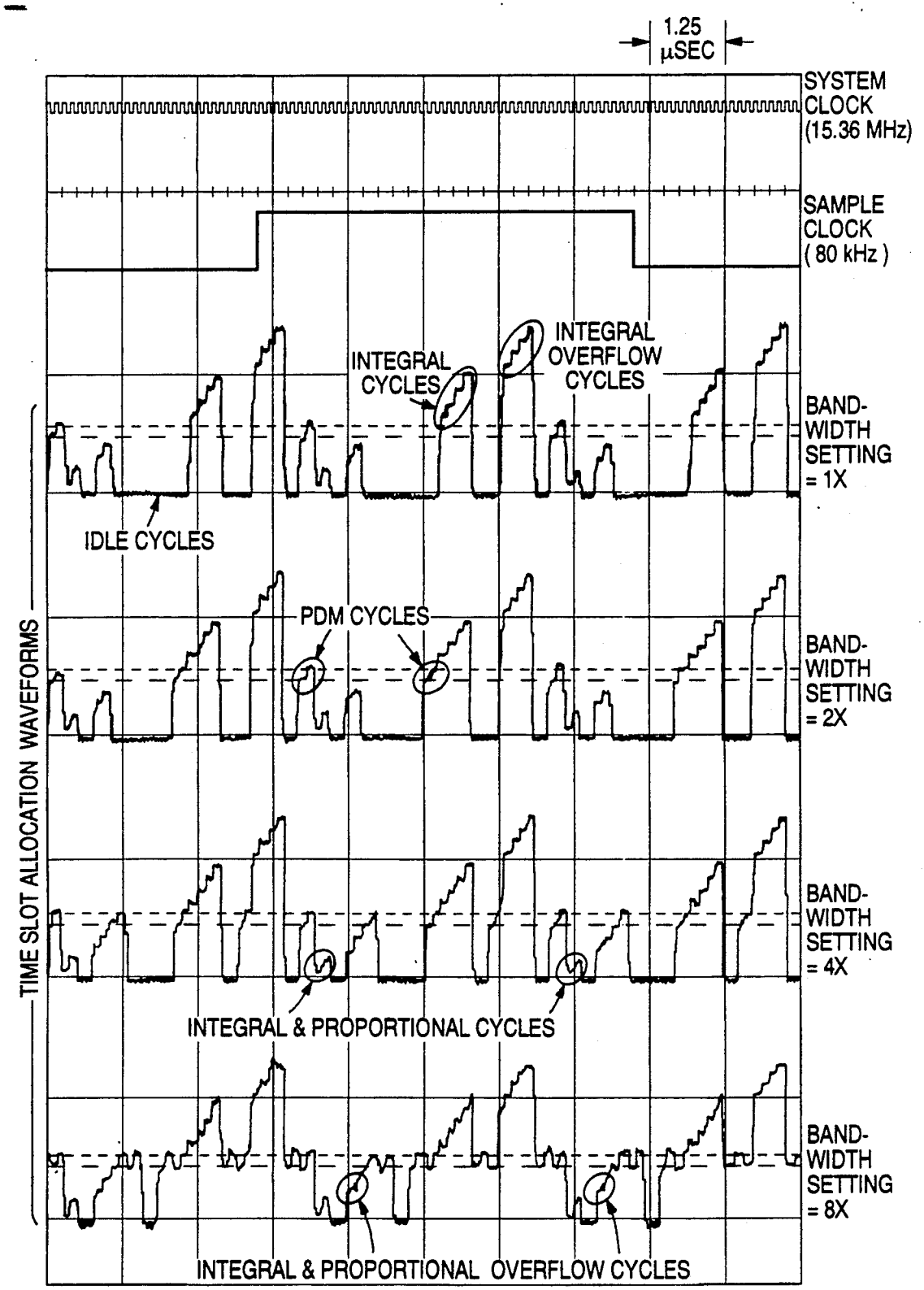
FIG. 7 is a diagram illustrating time slot allocation for the PDM accumulator of the system shown in FIGS. 6A-6I for different bandwidth settings.

Brief reference to the FIG. 7 time slot allocation diagram will be helpful in understanding the time-multiplexed operation of the ALU.

The upper waveform in FIG. 7 represents the 15.36 MHz system clock that drives the PDM accumulator, second-order loop filter circuit 100. The second waveform in FIG. 7 represents the 80 KHz sample clock output 16 of the stepped clock generator 24 (FIG. 4). The next four waveforms represent, in sequence, the time-multiplexed operation of the ALU 200 at four different bandwidth settings (1×, 2×, 4×, 8×) of the PDM accumulator operation performed by the ALU 200. The 1×, 2×, 4× and 8× bandwidth settings correspond to 3, 6, 12 and 24 PDM cycles, respectively.

As shown in FIG. 7, during a one cycle group of the system clock, the ALU 200 performs the function of the integrator/accumulator 108 (FIG. 5), adding the current 16-bit phase error input signal, which is generated by ROMs 201a and 201b and then provided at the outputs of D flip-flops 202, 204, and the previously calculator integral term retrieved from four 8-bit integral term ledger registers 206, 208, 210, 212; the result of this integrator/accumulator operation is then stored to the four integral term ledger registers 206, 208, 210, 212, replacing the previous term. The ROMs 201a and 201b utilize a full word control code SGSEL1.SRC and SGSEL2.SRC, respectively, to generate the phase error input (the source listings for these two programs are provided as Appendix A at the end of the detailed description.

Figure 1:
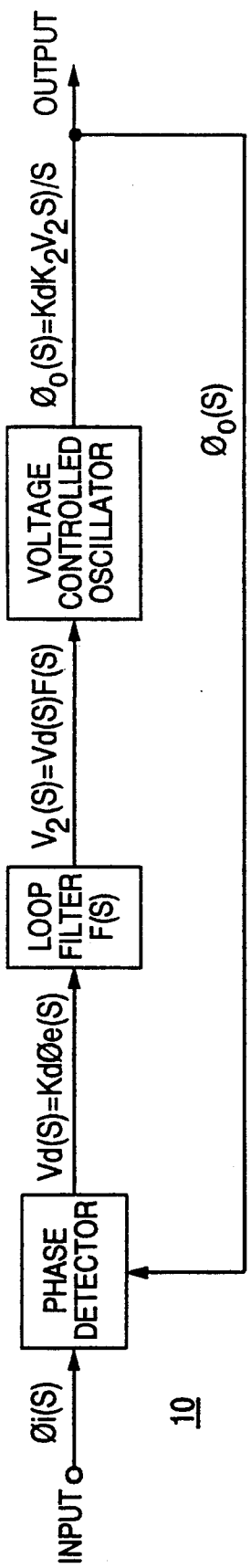
FIG. 1 is a block diagram illustrating a basic analog phase locked loop.
Figure 3:
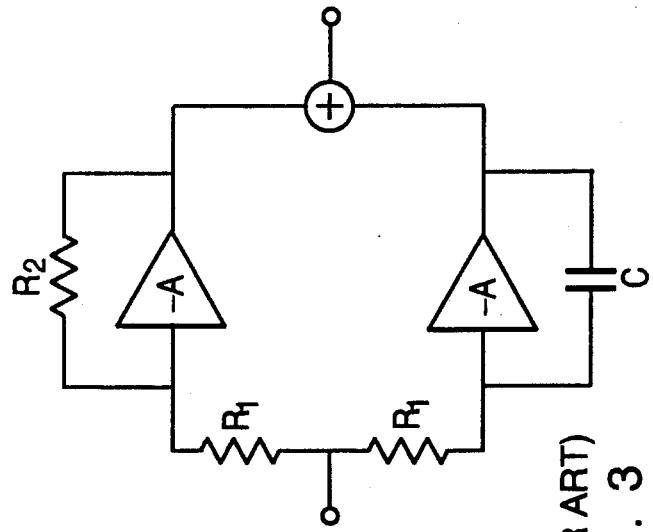
FIG. 3 is a schematic diagram illustrating the realization of the active filter shown in FIG. 2 utilizing two active filters in parallel to generate proportional and integral terms.
Figure 2:
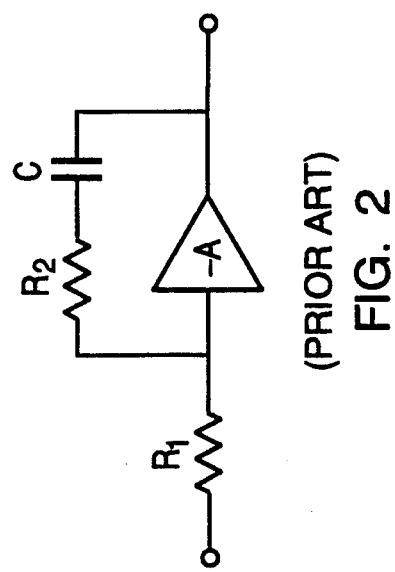
FIG. 2 is a schematic diagram illustrating an active filter of the type utilizable in a conventional analog phase locked loop.

During a second cycle group, the ALU 200 performs the function of the integrator-plus-proportional accumulator 110 (FIG. 1), adding the current 16-bit phase error input signal and the previously-calculated integral-plus-proportional term retrieved from two 8-bit integrator-plus-proportional ledger registers 214, 216; the result of this integral-plus-proportional accumulator operation is then stored to the integral-plus-proportional ledger registers 214, 216; replacing the previous integral-plus-proportional term.

During a third cycle group, the ALU 200 performs the function of the PDM accumulator 120 (FIG. 1), adding the current integral-plus-proportional term retrieved from the integral-plus-proportional ledger registers 214, 216 and the previously-calculated PDM accumulator term stored in two 8-bit PDM accumulator ledger registers 218, 220; the result of this PDM accumulator operation is then stored to the PDM accumulator ledger registers 218, 220, replacing the previous PDM accumulator term.

During the PDM accumulator operation, the overflow/underflow of the ALU is monitored by a PDM controller that comprises a ROM 222 that stores an overflow/underflow and direction code PLLODD.SRC, the source listing for which is provided as Appendix B at the end of this detailed description. This code provides a 2-bit output PSLOW and PJEN via stabilizing latch 224. The PJEN bit indicates whether a phase jump is to be taken by the associated multi-phase clock generator 24; the PSLOW bit indicates the direction of the phase jump.

The ALU 200 is controlled by an ALU controller comprising a ROM 226 and associated D flip-flop 228. The ROM stores a control code PLLCTL.SRC, the source listing for which is provided as Appendix C at the end of this detailed description, and responds to a set of control setting inputs provided to ROM 226 via latch 230.

The clocking and output enable cycles that synchronize the retrieval of information from and storage of information to the various ledger registers for the corresponding operations of the ALU 200 is controlled by a ledger controller that includes ROMS 232 and 234 that stores code PLLCKC.SRC the source listing for which are provided as Appendix D at the end of this detailed description.

Both the ALU controller and the ledger controller are driven by a sequencer that performs time slot allocation for the various cycle groups that the ALU 200 is to perform. A sequencer ROM 236 stores a program code PLLTSA.SRC, the source listing for which is provided as Appendix E at the end of this detailed description, which is a time slot allocation program for the ALU.

As stated above, FIG. 7 provides a timing diagram illustrating time slot allocation for the PDM accumulator, second-order loop filter system 100 shown in FIGS. 6A-6I. Time slot allocation waveforms are shown for four bandwidth settings: 1×, 2×, 4× and will show that the 1×, 2×, 4× and 8× bandwidth settings provide 3, 6, 12 and 24 PDM cycles, respectively, per sample clock period. Each PDM cycle is illustrated as a positive step within the PDM cursor boundary.

The time slot allocation signals shown in FIG. 7 were obtained utilizing a digital-to-analog converter at the outputs of a 4-bit D flip-flop, which was used to stabilize the monitored signals. The inputs of the D flip-flop were connected to pins 1-4 of controller ROM 226. The clock of the D flip-flop was connected to CLK input of component 228.

As further shown in FIG. 7, there are 96 cycles of the system clock in one sample clock period (12.5 μsec. The source program provided as Appendix F at the end of this detailed description provides the details of these cycles.

It should be understood that various alternatives to the embodiment of the invention described herein may be employed in practicing the invention. It is intended that the following claims define the scope of the invention and its structure and methods within the scope of these claims and their equivalents be covered thereby.

```
[BJR vL11]     Jul 28 1987  [2071]              UIF/PLLCTL.DATA (256x8)
 RFTCP v2.1 2-85 HHee                  [000.01.39]  [000.03.59.C 1s1s....c.]
 Address bit (A):  '0'=Address bar       '1'=Address    '-'=no connection
  Data  bit (D):  '-'=no connection     '1'=wired OR   'o'=AND-HOR Pt#   (A)7654 3210   (D)7654 3210
                           o o   o o
     (1)   0--- -01-      1111 -11-
     (2)   0--- 10--      1111 -11-
     (3)   -00- -10-      1-1- 1--1
     (4)   -00- 11--      1-1- 1--1
     (5)   -01- 010-      11-1 1-1-
     (6)   -01- 11--      11-1 1-1-
     (7)   ---- 000-      1111 1-1-
     (8)   ---- 0111      111- ----
     (9)   ---- -0-1      -11- ----
     (10)  ---- ---0      1-1- ----

(11)  ---- 1-0-      1-1- ----
     (12)  ---1 101-      -11- -11-
     (13)  -10- -10-      11-1 -1-1
     (14)  -10- 11--      11-1 -1-1
     (15)  -11- -10-      1-1- 1--1
     (16)  -11- 11--      1-1- 1--1
     (17)  1--0 101-      -11- 1--1

Size of matrix = 17x(8x2+8) = 408
```

```
10   ! PLLTSA.SRC      MAR 87      REVISION 0      MAR 18,87
20   ! UIF PLL TIME SLOT ALLOCATOR
30   MASS STORAGE IS "UIF:CS80,7"
40   OPTION BASE 0
50   DOUBLE Op(16383),Addbit,Datbit,Add,Buc,Buca,Cnt,Tcode,P80,P160,Conv,Ld
60   DOUBLE Idle,Ipp0,Ipp1,Ipo0,Ipo1,Pdm0,Pdm1
70   DOUBLE Iad0,Iad1,Iad2,Iad3,Iov0,Iov1,Iov2,Iov3
80   File$="PLLTSA.DATA"
90   Addbit=9
100  Datbit=8
110  Idle=1    ! idle code
120  Ipp0=2    ! Integrator+proportional cycle (low byte)
130  Ipp1=3    ! Integrator+proportional cycle (high byte)
140  Ipo0=4    ! Integrator+proportional overflow cycle (low byte)
150  Ipo1=5    ! Integrator+proportional overflow cycle (high byte)
160  Pdm0=6    ! PDM cycle (low byte)
170  Pdm1=7    ! PDM cycle (high byte)
180  Iad0=8    ! Integrator cycle (low byte)
190  Iad1=9    ! Integrator cycle (low +1 byte)
200  Iad2=10   ! Integrator cycle (low +2 byte)
210  Iad3=11   ! Integrator cycle (high byte)
220  Iov0=12   ! Integrator overflow cycle (low byte)
230  Iov1=13   ! Integrator overflow cycle (low +1 byte)
240  Iov2=14   ! Integrator overflow cycle (low +2 byte)
250  Iov3=15   ! Integrator overflow cycle (high byte)
260  REDIM Op(2^Addbit-1)
270  PRINT PAGE
280  FOR Add=0 TO 2^Addbit-1
290     Def_ip(Add,"11------",Buc)    ! 0:24 slots, 1:12, 2:6, 3:3
300     Def_ip(Add,"--1111111",Cnt)
310     !
320     P80=P160=Conv=Ld=0
330     IF (Cnt>=26) AND (Cnt<=73) THEN P80=1
340     IF (Cnt>=0) AND (Cnt<=1) THEN P160=1
350     IF (Cnt>=26) AND (Cnt<=49) THEN P160=1
360     IF (Cnt>=74) AND (Cnt<=95) THEN P160=1
370     IF Cnt=76 THEN Conv=1
380     IF Cnt>=95 THEN Ld=1
390     !
400     Tcode=Idle
410     IF (Cnt>=0) AND (Cnt<=95) THEN
420        Buca=Buc
430        IF Buc=0 THEN Buca=1
440        IF (((Cnt+4) MOD (4*2^Buca))=0) AND (Buc=0) THEN
450           Tcode=Pdm0
460        END IF
470        IF (((Cnt+2) MOD (4*2^Buca))=0) THEN
480           Tcode=Pdm0
490        END IF
500        IF (((Cnt+3) MOD (4*2^Buca))=0) AND (Buc=0) THEN
510           Tcode=Pdm1
520        END IF
530        IF (((Cnt+1) MOD (4*2^Buca))=0) THEN
540           Tcode=Pdm1
550        END IF
560        Cnta=BINAND(Cnt,31)
570        SELECT Cnta
580        CASE 8
590           IF Buc=0 THEN Tcode=Pdm0
600        CASE 9
610           IF Buc=0 THEN Tcode=Pdm1
620        CASE 16                    ! integrator cycles
630           Tcode=Iad0
```

```
10   ! PLLCTL.SRC      MAR 87      REVISION 0      MAR 18,87
20   ! UIF PLL ADDER CONTROLLER
30   MASS STORAGE IS "UIF:CS80,7"
40   OPTION BASE 0
50   DOUBLE Op(16383),Addbit,Datbit,Add,Enpll,Pnover,Bsgn,Tcode
```

```
60    DOUBLE Ovfl,Cryen,Invmsb,Smcode,Dcare,Pover,Nover
70    DOUBLE Idle,Ipp0,Ipp1,Ipo0,Ipo1,Pdm0,Pdm1
80    DOUBLE Iad0,Iad1,Iad2,Iad3,Iov0,Iov1,Iov2,Iov3
90    DOUBLE Apb,Apc,Am1,All,Al0,Ap0
100   File$="PLLCTL.DATA"
110   Addbit=8
120   Datbit=8
130   Dcare=65536
140   !
150   Apb=DVAL("01001",2)   ! F=A+B+Carry
160   Apc=DVAL("00000",2)   ! F=A+Carry
170   Am1=DVAL("01111",2)   ! F=A-1+Carry
180   All=DVAL("11100",2)   ! F=all one's
190   Al0=DVAL("10011",2)   ! F=all zero's
200   Ap0=DVAL("11111",2)   ! F=A
210   Pover=2 ! positive overflow
220   Nover=1 ! negative overflow
230   !
240   Idle=1    ! idle code
250   Ipp0=2    ! Integrator+proportional cycle (low byte)
260   Ipp1=3    ! Integrator+proportional cycle (high byte)
270   Ipo0=4    ! Integrator+proportional overflow cycle (low byte)
280   Ipo1=5    ! Integrator+proportional overflow cycle (high byte)
290   Pdm0=6    ! PDM cycle (low byte)
300   Pdm1=7    ! PDM cycle (high byte)
310   Iad0=8    ! Integrator cycle (low byte)
320   Iad1=9    ! Integrator cycle (low +1 byte)
330   Iad2=10   ! Integrator cycle (low +2 byte)
340   Iad3=11   ! Integrator cycle (high byte)
350   Iov0=12   ! Integrator overflow cycle (low byte)
360   Iov1=13   ! Integrator overflow cycle (low +1 byte)
370   Iov2=14   ! Integrator overflow cycle (low +2 byte)
380   Iov3=15   ! Integrator overflow cycle (high byte)
390   REDIM Op(2^Addbit-1)
400   PRINT PAGE
410   FOR Add=0 TO 2^Addbit-1
420     Def_ip(Add,"1-------",Enpll)
430     Def_ip(Add,"-11-----",Pnover)
440     Def_ip(Add,"---1----",Bsgn)
450     Def_ip(Add,"----1111",Tcode)
460     Ovfl=Invmsb=0
470     Cryen=Dcare           ! Carry in = don't care
480     Smcode=(Dcare*16)+(Dcare*8)+(Dcare*4)+(Dcare*2)+Dcare
490     !
500     SELECT Tcode
510     CASE 0     ! clear cycle
520       Smcode=Al0
530     CASE Idle
540       Invmsb=Dcare
550     CASE Ipp0  ! Integrator + proportional
560       SELECT Enpll
570       CASE 1
580         Cryen=0
590         Smcode=Apb
600       CASE 0
610         Smcode=Ap0
620       END SELECT
650       CASE 1
660         Ovfl=1
670         Cryen=1
680         Smcode=Apb
690       CASE 0
700         Smcode=Ap0
710       END SELECT
720     CASE Ipo0,Iov0,Iov1,Iov2
730       SELECT Pnover
740       CASE Pover
750         Smcode=All
760       CASE Nover
```

```
770        Smcode=A10
780      CASE ELSE
790        Cryen=0
800        Smcode=Apc
810      END SELECT
820    CASE Ipo1,Iov3
830      SELECT Pnover
840      CASE Pover
850        Invmsb=1
860        Smcode=A11
870      CASE Nover
880        Invmsb=1
890        Smcode=A10
900      CASE ELSE
910        Cryen=0
920        Smcode=Apc
930      END SELECT
940    CASE Pdm0
950      Cryen=0
960      Smcode=Apb
970    CASE Pdm1
980      Cryen=1
990      Smcode=Apb
1000   CASE Iad0      ! Integrator
1010     SELECT Enpll
1020     CASE 1
1030       Cryen=0
1040       Smcode=Apb
1050     CASE 0
1060       Smcode=Ap0
1070     END SELECT
1080   CASE Iad1      ! Integrator
1090     SELECT Enpll
1100     CASE 1
1110       Cryen=1
1120       Smcode=Apb
1130     CASE 0
1140       Smcode=Ap0
1150     END SELECT
1160   CASE Iad2      ! Integrator
1170     SELECT Enpll
1180     CASE 1
1190       Cryen=1
1200       Smcode=Apc
1210       IF Bsgn=1 THEN Smcode=Am1
1220     CASE 0
1230       Smcode=Ap0
1240     END SELECT
1250   CASE Iad3      ! Integrator
1260     SELECT Enpll
1270     CASE 1
1280       Ovfl=1
1310       IF Bsgn=1 THEN Smcode=Am1
1320     CASE 0
1330       Smcode=Ap0
1340     END SELECT
1350   END SELECT
1360   !
1370   Op(Add)=0
1380   Def_op(Op(Add),"1-------",Ovfl)      ! enable overflow checking
1390   Def_op(Op(Add),"-1------",Cryen)     ! enable carry
1400   Def_op(Op(Add),"--1-----",Invmsb)    ! Invert msb
1410   Def_op(Op(Add),"---11111",Smcode)    ! 181 Sx,M control code
1420   Print_bin(Add,Addbit,"","   ","!")
1430   Print_bin(Op(Add),Datbit,""," ",".")
1440 NEXT Add
1450 Write_data_file(File$,Op(*),Addbit,Datbit)
1460 END
1470 !
```

```
>>>>>> SUB Write_data_file(File$,DOUBLE Outdata(*),Abit,Dbit)
>>>>>> SUB Read_data_file(File$,DOUBLE Inf(*),Indata(*))
>>>>>> SUB Def_ip(DOUBLE Addr,M$,DOUBLE X)
>>>>>> SUB Def_op(DOUBLE Output,M$,DOUBLE X)
>>>>>> SUB Print_hex(DOUBLE X,Length,X$,Y$,Z$)
>>>>>> SUB Print_bin(DOUBLE X,Length,X$,Y$,Z$)
>>>>>> SUB Convert_hex(DOUBLE X,Length,Hex$)
>>>>>> SUB Convert_bin(DOUBLE X,Length,Bin$)
>>>>>> SUB Dbl_string(DOUBLE X,X$)

650        Tcode=Iad1
    660     CASE 18
    670        Tcode=Iad2
    680     CASE 19
    690        Tcode=Iad3
    700     CASE 24            ! integrator overflow cycles
    710        Tcode=Iov0
    720     CASE 25
    730        Tcode=Iov1
    740     CASE 26
    750        Tcode=Iov2
    760     CASE 27
    770        Tcode=Iov3
    780     CASE 0             ! integrator + proportional cycles
    790        Tcode=Ipp0
    800     CASE 1
    810        Tcode=Ipp1
    820     CASE 4             ! integrator + proportional overflow cycles
    830        Tcode=Ipo0
    840     CASE 5
    850        Tcode=Ipo1
    860     END SELECT
    870   END IF
    880   !
    890   Op(Add)=0
    900   Def_op(Op(Add),"1111----",Tcode)
    910   Def_op(Op(Add),"----1---",P80)
    920   Def_op(Op(Add),"-----1--",P160)
    930   Def_op(Op(Add),"------1-",Conv)
    940   Def_op(Op(Add),"-------1",Ld)
    950   Print_bin(Add,Addbit,""," ",";")
    960   Print_bin(Op(Add),Datbit,""," ",".")
    970 NEXT Add
    980 Write_data_file(File$,Op(*),Addbit,Datbit)
    990 END
   1000 !
>>>>>> SUB Write_data_file(File$,DOUBLE Outdata(*),Abit,Dbit)
>>>>>> SUB Read_data_file(File$,DOUBLE Inf(*),Indata(*))
>>>>>> SUB Def_ip(DOUBLE Addr,M$,DOUBLE X)
>>>>>> SUB Def_op(DOUBLE Output,M$,DOUBLE X)
>>>>>> SUB Print_hex(DOUBLE X,Length,X$,Y$,Z$)
>>>>>> SUB Print_bin(DOUBLE X,Length,X$,Y$,Z$)
>>>>>> SUB Convert_hex(DOUBLE X,Length,Hex$)
>>>>>> SUB Convert_bin(DOUBLE X,Length,Bin$)
>>>>>> SUB Dbl_string(DOUBLE X,X$)
```

[BURRLAB]      Jul 28 1987  [2072]              UIF/PLLTSA.DATA (512x8)
RPTCP v2.1 2-85 WH@@            [000.02.45]  [000.15.45.C 1:1.....cc]
Address bit (A): '0'=Address bar    '1'=Address    '-'=no connection
   Data bit (D): '-'=no connection  '1'=wired OR   'o'=AND-NOR

```
    Pt#  (A)8 7654 3210   (D)7654 3210
                               oo
    <1>    - -001 1-1-       ---- 11--
    <2>    - -001 118-       ---- 11--
    <3>    - -0-0 800-       ---- -1--
    <4>    - -0-1 -8--       1--- ----
```

```
    <5>     - -010 ----     ---- 11--
    <6>     - -01- 000-     ---- 11--
    <7>     - -011 ----     ---- 1---
    <8>     - --01 -0--     1--- ----
    <9>     - ---0 010-     --1- ----
    <10>    - ---0 -01-     -111 ----

<11>    - ---- 00--     -1-- ----
    <12>    - ---- ---1     ---1 ----
    <13>    - ---1 -00-     --1- ----
    <14>    - -100 0---     ---- 1---
    <15>    - -100 -00-     ---- 1---
    <16>    - -100 1100     ---- --1-
    <17>    - -10- 1-1-     ---- -1--
    <18>    - -10- 11--     ---- -1--
    <19>    - -101 ----     ---- -1--
    <20>    - -1-1 1111     ---- ---1

<21>    - -11- ----     -111 ---1
    <22>    - 1--0 1-0-     -111 ----
    <23>    - 1--1 -10-     -111 ----
    <24>    1 ---0 1-0-     -111 ----
    <25>    1 ---- 011-     -111 ----
    <26>    1 ---1 -10-     -111 ----
    <27>    1 1--0 1---     -111 ----
```

Size of matrix = 27x(9x2+8) = 702

```
10   ! PLLCSL.SRC      MAR 87    REVISION 0    MAR 18,87
20   ! UIF PLL CLOCK SELECTOR
30   MASS STORAGE IS "UIF:CS80,7"
40   OPTION BASE 0
50   DOUBLE Op(16383),Addbit,Datbit,Add,Dirctl,Cntin,Cntout
60   DOUBLE Stb0,Stb1,Stb2,Fast,Slow,Hold
70   File$="PLLCSL.DATA"
80   Addbit=7
90   Datbit=8
100  REDIM Op(2^Addbit-1)
110  Fast=3
120  Slow=1
130  Hold=0
140  PRINT PAGE
150  FOR Add=0 TO 2^Addbit-1
160     Def_ip(Add,"11-----",Dirctl)   ! 3=fast, 1=slow, 0,2=hold
170     Def_ip(Add,"--11111",Cntin)
180     IF Dirctl=2 THEN Dirctl=Hold
190     !
200     SELECT Dirctl
210     CASE Hold
220        Cntout=Cntin
230     CASE Fast
240        Cntout=Cntin-1
250        IF Cntout<0 THEN Cntout=18
260     CASE Slow
270        Cntout=Cntin+1
280        IF Cntout>18 THEN Cntout=0
290     END SELECT
300     !
310     Stb0=Stb1=Stb2=1
320     SELECT Cntout
330     CASE 0 TO 7
340        Stb0=0
350     CASE 8 TO 15
360        Stb1=0
370     CASE ELSE
380        Stb2=0
390     END SELECT
400     Stb1=BINEOR(1,Stb1)
```

```
410   Stb2=BINEOR(1,Stb2)
420   !
430   Op(Add)=0
440   Def_op(Op(Add),"1-------",Stb2)
450   Def_op(Op(Add),"-1------",Stb1)
460   Def_op(Op(Add),"--1-----",Stb0)
470   Def_op(Op(Add),"---11111",Cntout)
480   Print_bin(Add,Addbit,""," ",";")
490   Print_bin(Op(Add),Datbit,""," ",".")
500  NEXT Add
510  Write_data_file(File$,Op(*),Addbit,Datbit)
520  END
530   !
>>>>>> SUB Write_data_file(File$,DOUBLE Outdata(*),Abit,Dbit)
>>>>>> SUB Read_data_file(File$,DOUBLE Inf(*),Indata(*))
>>>>>> SUB Def_ip(DOUBLE Addr,M$,DOUBLE X)
>>>>>> SUB Def_op(DOUBLE Output,M$,DOUBLE X)
>>>>>> SUB Print_hex(DOUBLE X,Length,X$,Y$,Z$)
>>>>>> SUB Print_bin(DOUBLE X,Length,X$,Y$,Z$)
>>>>>> SUB Convert_hex(DOUBLE X,Length,Hex$)
>>>>>> SUB Convert_bin(DOUBLE X,Length,Bin$)
>>>>>> SUB Dbl_string(DOUBLE X,X$)
```

```
[RMRIHBT]     Jul 28 1987  [2070]         UIF/FLLCSL.DATA (128x8)
RFTCP v2.1 2-85 WHee          [000.01.13] [000.06.47.C 1:1s....cc]
Address bit (A): '0'=Address bar  '1'=Address  '-'=no connection
  Data bit (D): '-'=no connection '1'=wired OR  'o'=AND-NOR Pt#   (A)654 3210   (D)7654 3210
                                   o
    <1>    0-0 --10      ---- --1-
    <2>    0-0 1--0      -11- 1---
    <3>    0-- -0-0      ---- -1--
    <4>    010 0111      -11- 11--
    <5>    010 --01      ---- --1-
    <6>    010 ---0      ---- ---1
    <7>    010 1111      1-11 -1--
    <8>    01- 0001      ---- --1-
    <9>    011 0000      1-11 ---1
    <10>   011 ----      ---- -1--

<11>   -00 1---      -1-- ----
    <12>   -0- -0--      ---- -1--
    <13>   -0- ---1      ---- ---1
    <14>   -0- --1-      ---- --1-
    <15>   -0- 1---      --1- 1---
    <16>   -01 ----      1-11 ----
    <17>   --0 110-      -11- 1---
    <18>   --- -001      ---- --1-
    <19>   --1 0001      1-11 ----
    <20>   -10 10-1      -11- 1---

<21>   1-0 1-1-      -1-- ----
    <22>   1-- -01-      ---- -1--
    <23>   1-- --11      ---- --1-
    <24>   1-- 1--1      --1- 1---
    <25>   1-- 1-1-      --1- 1---
    <26>   1-- 11--      --1- 1---
    <27>   1-1 010-      1-11 ----
    <28>   1-1 --1-      1-11 ----
    <29>   1-1 1---      1-11 ----
    <30>   110 0000      1-11 -11-

<31>   11- --10      ---- ---1
    <32>   11- -100      ---- -111
    <33>   11- 1-00      ---- --11
    <34>   111 0000      -11- 1-11

Size of matrix = 34x(7x2+8) = 748
```

```
10  ! PLLCKC.SRC      MAR 87      REVISION 0      MAR 18,87
20  ! UIF PLL ADDER CLOCK CONTROLLER
30  MASS STORAGE IS "UIF:CS80,7"
40  OPTION BASE 0
50  DOUBLE Op(16383),Addbit,Datbit,Add,Enitg,Tcode
60  DOUBLE X1,X0,I3e,I3c,I2e,I2c,I1e,I1c,I0e,Ip1e,Ip1c,Ip0e,Ip0c,P1e,P1c,P0
70  DOUBLE Idle,Ipp0,Ipp1,Ipo0,Ipo1,Pdm0,Pdm1
80  DOUBLE Iad0,Iad1,Iad2,Iad3,Iov0,Iov1,Iov2,Iov3
90  File$="PLLCKC.DATA"
100 Addbit=5
110 Datbit=16
120 !
130 Idle=1    ! idle code
140 Ipp0=2    ! Integrator+proportional cycle (low byte)
150 Ipp1=3    ! Integrator+proportional cycle (high byte)
160 Ipo0=4    ! Integrator+proportional overflow cycle (low byte)
170 Ipo1=5    ! Integrator+proportional overflow cycle (high byte)
180 Pdm0=6    ! PDM cycle (low byte)
190 Pdm1=7    ! PDM cycle (high byte)
200 Iad0=8    ! Integrator cycle (low byte)
210 Iad1=9    ! Integrator cycle (low +1 byte)
220 Iad2=10   ! Integrator cycle (low +2 byte)
230 Iad3=11   ! Integrator cycle (high byte)
240 Iov0=12   ! Integrator overflow cycle (low byte)
250 Iov1=13   ! Integrator overflow cycle (low +1 byte)
260 Iov2=14   ! Integrator overflow cycle (low +2 byte)
270 Iov3=15   ! Integrator overflow cycle (high byte)
280 REDIM Op(2^Addbit-1)
290 PRINT PAGE
300 FOR Add=0 TO 2^Addbit-1
310   Def_ip(Add,"1----",Enitg)
320   Def_ip(Add,"-1111",Tcode)
330   !
340   X1=X0=I3e=I3c=I2e=I2c=I1e=I1c=I0e=Ip1e=Ip1c=Ip0e=Ip0c=P1e=P1c=P0e=0
350   SELECT Tcode
360   CASE 0    ! clear cycle
370     SELECT Enitg
380     CASE 1
390       I3c=I2c=I1c=I0e=Ip1c=Ip0c=P1c=P0e=1
400     CASE 0
410       Ip0e=Ip1c=Ip0c=P1c=P0e=1
420     END SELECT
430   CASE Idle
440     X0=Ip0e=1
450   CASE Ipp0
460     X0=I2e=Ip0c=1
470   CASE Ipp1
480     X1=I3e=Ip1c=1
490   CASE Ipo0
500     X0=Ip0e=Ip0c=1
510   CASE Ipo1
520     X0=Ip1e=Ip1c=1
530   CASE Pdm0
540     Ip0e=P0e=1
550   CASE Pdm1
560     Ip1e=P1e=P1c=1
570   CASE Iad0,Iov0
580     X0=I0e=1
590     IF Enitg=0 THEN
600       I0e=0
610       Ip0e=1
620     END IF
630   CASE Iad1,Iov1
640     X1=I1e=I1c=1
650     IF Enitg=0 THEN I1c=0
660   CASE Iad2,Iov2
670     X0=I2e=I2c=1
680     IF Enitg=0 THEN I2c=0
690   CASE Iad3,Iov3
700     X1=I3e=I3c=1
```

```
710      IF Enitg=0 THEN I3c=0
720    END SELECT
730    !
740    Op(Add)=0
750    Def_op(Op(Add),"1----------------",X1)    ! input 2nd enable
760    Def_op(Op(Add),"-1---------------",X0)    ! input 1st enable
770    Def_op(Op(Add),"--1--------------",I3e)   ! Integrator 4th enable
780    Def_op(Op(Add),"---1-------------",I3c)   ! Integrator 4th clock
790    Def_op(Op(Add),"----1------------",I2e)   ! Integrator 3rd enable
800    Def_op(Op(Add),"-----1-----------",I2c)   ! Integrator 3rd clock
810    Def_op(Op(Add),"------1----------",I1e)   ! Integrator 2nd enable
820    Def_op(Op(Add),"-------1---------",I1c)   ! Integrator 2nd clock
830    Def_op(Op(Add),"--------1--------",I0e)   ! Integrator 1st enable/cloc
840    Def_op(Op(Add),"---------1-------",Ip1e)  ! Intg+prop 2nd enable
850    Def_op(Op(Add),"----------1------",Ip1c)  ! Intg+prop 2nd clock
860    Def_op(Op(Add),"-----------1-----",Ip0e)  ! Intg+prop 1st enable
870    Def_op(Op(Add),"------------1----",Ip0c)  ! Intg+prop 1st clcok
880    Def_op(Op(Add),"-------------1---",P1e)   ! PDM 2nd enable
890    Def_op(Op(Add),"--------------1--",P1c)   ! PDM 2nd clock
900    Def_op(Op(Add),"---------------1-",P0e)   ! PDM 1st enable/clock
910    Print_bin(Add,Addbit,""," ",";")
920    Print_bin(Op(Add),Datbit,""," ",".")
930  NEXT Add
940  Write_data_file(File$,Op(*),Addbit,Datbit)
950  END
960  !
>>>>>> SUB Write_data_file(File$,DOUBLE Outdata(*),Abit,Dbit)
>>>>>> SUB Read_data_file(File$,DOUBLE Inf(*),Indata(*))
>>>>>> SUB Def_ip(DOUBLE Addr,M$,DOUBLE X)
>>>>>> SUB Def_op(DOUBLE Output,M$,DOUBLE X)
>>>>>> SUB Print_hex(DOUBLE X,Length,X$,Y$,Z$)
>>>>>> SUB Print_bin(DOUBLE X,Length,X$,Y$,Z$)
>>>>>> SUB Convert_hex(DOUBLE X,Length,Hex$)
>>>>>> SUB Convert_bin(DOUBLE X,Length,Bin$)
>>>>>> SUB Dbl_string(DOUBLE X,X$)
```

[RFTCP]    Jul 27 1987  [2069]           UIF/PLLCKC.DATA (32x16)
RFTCP v2.1 2-85 WH&e      [000.01.44]   [003.54.24.C 1s1s1s..cc]
Address bit (A): '0'=Address bar  '1'=Address   '-'=no connection
Data    bit (D): '-'=no connection '1'=wired OR '0'=AND-NOR

| Pt# | (A)4 3210 | (D)fedc ba98 7654 3210 |
|---|---|---|
|     |         | o   o   o   o |
| <1> | 0 --00  | ---- ---- ---1 ---- |
| <2> | 0 ----  | ---1 -1-1 1--- ---- |
| <3> | - 0000  | ---- ---- --1- 1-11 |
| <4> | - 0001  | -1-1 -1-1 1--1 ---- |
| <5> | - 0010  | -1-1 11-1 1--- 1--- |
| <6> | - 0011  | 1-11 -1-1 1-1- ---- |
| <7> | - 0100  | -1-1 -1-1 1--1 1--- |
| <8> | - 0101  | -1-1 -1-1 111- ---- |
| <9> | - 0110  | ---1 -1-1 1--1 ---1 |
| <10>| - 0111  | ---1 -1-1 11-- -11- |
| <11>| - 1-00  | -1-1 -1-1 ---- ---- |
| <12>| - 1-01  | 1--1 -11- 1--- ---- |
| <13>| - 1-10  | -1-1 1--1 1--- ---- |
| <14>| - 1-11  | 1-1- -1-1 1--- ---- |

Size of matrix = 14x(5x2+16) = 364

```
10  ! PLLODD.SRC     MAR 87    REVISION 0    MAR 18,87
20  ! UIF PLL ADDER OVERFLOW & DIRECTION DECODER
30  MASS STORAGE IS "UIF:CS80,7"
40  OPTION BASE 0
50  DOUBLE Op(16383),Addbit,Datbit,Add,Pdm,Ovfl,Asgn,Bsgn,Fsgn,Pnover_in
60  DOUBLE Dir,Pnover,Pover,Nover,No_over,Fast,Slow,Hold
70  File$="PLLODD.DATA"
```

```
80   Addbit=7
90   Datbit=4
100  REDIM Op(2^Addbit-1)
110  Pover=2
120  Nover=1
130  No_over=0
140  Fast=3
150  Slow=1
160  Hold=0
170  PRINT PAGE
180  FOR Add=0 TO 2^Addbit-1
190     Def_ip(Add,"11-----",Pnover_in)
200     Def_ip(Add,"--1----",Ovfl)
210     Def_ip(Add,"---1---",Fsgn)
220     Def_ip(Add,"----1--",Asgn)
230     Def_ip(Add,"-----1-",Bsgn)
240     Def_ip(Add,"------1",Pdm)
250     !
260     Dir=Hold
270     Pnover=Pnover_in
280     IF Pdm=1 THEN       ! if PDM cycle, send direction
290        IF (Asgn=0) AND (Bsgn=0) AND (Fsgn=1) THEN Dir=Fast
300        IF (Asgn=1) AND (Bsgn=1) AND (Fsgn=0) THEN Dir=Slow
310     END IF
320     IF Ovfl=1 THEN
330        Pnover=No_over
340        IF (Asgn=0) AND (Bsgn=0) AND (Fsgn=1) THEN Pnover=Pover
350        IF (Asgn=1) AND (Bsgn=1) AND (Fsgn=0) THEN Pnover=Nover
360     END IF
370     !
380     Op(Add)=0
390     Def_op(Op(Add),"11--",Pnover)
400     Def_op(Op(Add),"--11",Dir)
410     Print_bin(Add,Addbit,""," ",";")
420     Print_bin(Op(Add),Datbit,""," ",".")
430  NEXT Add
440  Write_data_file(File$,Op(*),Addbit,Datbit)
450  END
460  !
>>>>>> SUB Write_data_file(File$,DOUBLE Outdata(*),Abit,Dbit)
>>>>>> SUB Read_data_file(File$,DOUBLE Inf(*),Indata(*))
>>>>>> SUB Def_ip(DOUBLE Addr,M$,DOUBLE X)
>>>>>> SUB Def_op(DOUBLE Output,M$,DOUBLE X)
>>>>>> SUB Print_hex(DOUBLE X,Length,X$,Y$,Z$)
>>>>>> SUB Print_bin(DOUBLE X,Length,X$,Y$,Z$)
>>>>>> SUB Convert_hex(DOUBLE X,Length,Hex$)
>>>>>> SUB Convert_bin(DOUBLE X,Length,Bin$)
>>>>>> SUB Dbl_string(DOUBLE X,X$)
```

```
          Jul 28 1987  [2073]           UIF/FLLOID.DATA (128x4)
RFTCP v2.1 2-85 WHee        [000.00.35]  [000.00.04.C 1:......C.]
Address bit (A): '0'=Address bar    '1'=Address    '-'=no connection
Data    bit (D): '-'=no connection  '1'=wired OR   '0'=AND-NOR Pt#   (A)654 3210   (D)3210

<1>    ---  0111    ---1
<2>    ---  1001    --11
<3>    --1  011-    -1--
<4>    --1  100-    1---
<5>    -10  ----    -1--
<6>    1-0  ----    1---

Size of matrix = 6x(7x2+4) = 108
```

```
10   ! SGSEL1.SRC    JULY 87    REVISION 0   JULY 15,87
20   ! UIF PLL SIGN/FULL WORD CONTROL
30   MASS STORAGE IS "UIF:CS80,7"
40   OPTION BASE 0
50   DOUBLE Op(16383),Addbit,Datbit,Add,Sgon,Sign,Word,Wd
60   File$="SGSEL1.DATA"
70   Addbit=9
80   Datbit=8
90   REDIM Op(2^Addbit-1)
100  !
110  PRINT PAGE
120  FOR Add=0 TO 2^Addbit-1
130     Def_ip(Add,"1--------",Sgon)
140     Def_ip(Add,"-1-------",Sign)
150     Def_ip(Add,"--1111111",Word)
160     !
170     Wd=Word*2
180     IF (Sgon=1) AND (Sign=0) THEN Wd=DVAL("11111110",2)
190     IF (Sgon=1) AND (Sign=1) THEN Wd=DVAL("00000000",2)
200     !
210     Op(Add)=0
220     Def_op(Op(Add),"11111111",Wd)
230     Print_bin(Add,Addbit,""," ",";")
240     Print_bin(Op(Add),Datbit,""," ",".")
250  NEXT Add
260  Write_data_file(File$,Op(*),Addbit,Datbit)
270  END
280  !
>>>>>> SUB Write_data_file(File$,DOUBLE Outdata(*),Abit,Dbit)
>>>>>> SUB Read_data_file(File$,DOUBLE Inf(*),Indata(*))
>>>>>> SUB Def_ip(DOUBLE Addr,M$,DOUBLE X)
>>>>>> SUB Def_op(DOUBLE Output,M$,DOUBLE X)
>>>>>> SUB Print_hex(DOUBLE X,Length,X$,Y$,Z$)
>>>>>> SUB Print_bin(DOUBLE X,Length,X$,Y$,Z$)
>>>>>> SUB Convert_hex(DOUBLE X,Length,Hex$)
>>>>>> SUB Convert_bin(DOUBLE X,Length,Bin$)
>>>>>> SUB Dbl_string(DOUBLE X,X$)
```

| | Jul 28 1987. [2074] | | UIF/SGSEL1.DATA (512x8) |
|---|---|---|---|
| RPTCP v2.1 2-85 WH&e | | [000.02.27] | [000.00.59.C 1........]|
| Address bit (A): '0'=Address bar | | '1'=Address | '-'=no connection |
| Data bit (D): '-'=no connection | | '1'=wired OR | 'o'=AND-NOR |

| Pt# | (A)8 7654 3210 | (D)7654 3210 | Note: D0=logical 0 |
|---|---|---|---|
| <1> | 0 ---- ---1 | ---- --1- | |
| <2> | 0 ---- --1- | ---- -1-- | |
| <3> | 0 ---- -1-- | ---- 1--- | |
| <4> | 0 ---- 1--- | ---1 ---- | |
| <5> | 0 ---1 ---- | --1- ---- | |
| <6> | 0 --1- ---- | -1-- ---- | |
| <7> | 0 -1-- ---- | 1--- ---- | |
| <8> | 1 0--- ---- | 1111 111- | |

Size of matrix = 8x(9x2+8) = 208

```
10   ! SGSEL2.SRC    JULY 87    REVISION 0   JULY 15,87
20   ! UIF PLL SIGN/FULL WORD CONTROL
30   MASS STORAGE IS "UIF:CS80,7"
40   OPTION BASE 0
50   DOUBLE Op(16383),Addbit,Datbit,Add,Sgon,Sign,Word,Wd
60   File$="SGSEL2.DATA"
70   Addbit=9
80   Datbit=8
90   REDIM Op(2^Addbit-1)
100  !
110  PRINT PAGE
```

```
120   FOR Add=0 TO 2^Addbit-1
130     Def_ip(Add,"1--------",Sgon)
140     Def_ip(Add,"-1-------",Sign)
150     Def_ip(Add,"-11111111",Word)
160     !
170     Wd=Word
180     IF (Sgon=1) AND (Sign=0) THEN Wd=DVAL("01111111",2)
190     IF (Sgon=1) AND (Sign=1) THEN Wd=DVAL("10000000",2)
200     !
210     Op(Add)=0
220     Def_op(Op(Add),"11111111",Wd)
230     Print_bin(Add,Addbit,""," ",";")
240     Print_bin(Op(Add),Datbit,""," ",".")
250   NEXT Add
260   Write_data_file(File$,Op(*),Addbit,Datbit)
270   END
280   !
>>>>>> SUB Write_data_file(File$,DOUBLE Outdata(*),Abit,Dbit)
>>>>>> SUB Read_data_file(File$,DOUBLE Inf(*),Indata(*))
>>>>>> SUB Def_ip(DOUBLE Addr,M$,DOUBLE X)
>>>>>> SUB Def_op(DOUBLE Output,M$,DOUBLE X)
>>>>>> SUB Print_hex(DOUBLE X,Length,X$,Y$,Z$)
>>>>>> SUB Print_bin(DOUBLE X,Length,X$,Y$,Z$)
>>>>>> SUB Convert_hex(DOUBLE X,Length,Hex$)
>>>>>> SUB Convert_bin(DOUBLE X,Length,Bin$)
>>>>>> SUB Dbl_string(DOUBLE X,X$)
```

| | Jul 26 1987 [2075] | | UIF/SGSEL2.DATA (512x8) |
|---|---|---|---|
| RFTCF v2.1 2-85 WHee | | [000.02.35] [000.02.09.C 1..........] | |
| Address bit (A): '0'=Address bar | '1'=Address | '-'=no connection | |
| Data bit (D): '-'=no connection | '1'=wired OR | 'o'=AND-NOR | |

| Pt# | (A)8 7654 3210 | (D)7654 3210 |
|---|---|---|
| <1> | 0 ---- ---1 | ---- ---1 |
| <2> | 0 ---- --1- | ---- --1- |
| <3> | 0 ---- -1-- | ---- -1-- |
| <4> | 0 ---- 1--- | ---- 1--- |
| <5> | 0 ---1 ---- | ---1 ---- |
| <6> | 0 --1- ---- | --1- ---- |
| <7> | 0 -1-- ---- | -1-- ---- |
| <8> | - 1--- ---- | 1--- ---- |
| <9> | 1 0--- ---- | -111 1111 |

Size of matrix = 9x(9x2+8) = 234

What is claimed is:

1. A digital phase locked loop (DPLL) for tracking changes in the frequency of an incoming analog signal, the DPLL comprising:
   (a) a multi-phase clock generator responsive to a control signal for selecting one of a plurality of phase-separated clock signals generated by the multi-phase clock generator as a sample clock output signal;
   (b) phase comparator means for generating a multi-bit phase error signal corresponding to the phase difference between the incoming analog signal and the sample clock output signal;
   (c) proportional means responsible to the multi-bit phase error signal for generating a current multi-bit proportional term;
   (d) integrator accumulator means for accumulating the current proportional term to generate a current integral term;
   (e) summing means responsive to the current proportional term and the current integral term for generating a current multi-bit integral-plus-proportional term; and
   (f) pulse density modulation (PDM) accumulator means for accumulating the current multi-bit integral-plus-proportional term to generate the control signal, the control signal comprising components indicative of both the number of phase jumps to be taken by the multi-phase clock generator and the direction of the phase jumps.

2. A digital phase locked loop as in claim 1 wherein the proportional means comprises a proportional accumulator that includes an input register for stabilizing the multi-bit phase error signal and a divider responsive to the stabilized multi-bit phase error signal received from the input register for generating the current multi-bit proportional term.

3. A digital phase locked loop (DPLL) as in claim 1 wherein the integrator accumulator means comprises an integral term ledger storage means for storing a previously-calculated integral term and an adder for adding the current multi-bit proportional term and the previously-calculated integral term to generate the current integral term, the current integral term replacing the previously-calculated integral term stored in the integral term ledger storage means.

4. A digital phase locked loop (DPLL) as in claim 1 wherein the summing means comprises an integrator-plus-proportional ledger storage means for storing a previously-calculated integral-plus-proportional term and an adder for adding the current multi-bit proportional term and the current integral term to generate the current integral-plus-proportional term, the current integral-plus-proportional term replacing the previously-calculated integral-plus-proportional term in the integrator-plus-proportional ledger storage means.

5. A digital phase locked loop (DPLL) as in claim 1 wherein the pulse density modulation (PDM) accumulator means comprises a PDM accumulator ledger storage means for storing a previously-calculated PDM accumulator term and an adder for adding the current integral-plus-proportional term and the previously-calculated PDM accumulator term to generate the control signal and a current PDM accumulator term which replaces the previously-calculated PDM accumulator term in the PDM accumulator ledger storage means.

6. A digital phase locked loop (DPLL) for tracking changes in the frequency of an incoming analog signal, the DPLL comprising:

(a) a multi-phase clock generator responsive to a control signal for selecting one of a plurality of phase-separated clock signals generated by the multi-phase clock generator as a sample clock output signal;

(b) phase comparator means for generating a multi-bit phase error signal corresponding to the phase difference between the incoming analog signal and the sample clock output signal;

(c) proportional means responsive to the multi-bit phase error signal for generating a current multi-bit proportional term; and (d) time-multiplexed arithmetic means responsive to an externally generated system clock for performing a plurality of arithmetic functions during a time period defined by a selected number of system clock cycles, the time period comprising a plurality of system clock cycle groups, the time-multiplexed arithmetic means including (i) integrator accumulator means for accumulating the current proportional term during a first system clock cycle group to generate a current integral term;

(ii) summing means responsive to the current proportional term and the current integral term during a second system clock cycle group for generating a current multi-bit integral-plus-proportional term; and (iii) pulse density modulation (PDM) accumulator means for accumulating the current multi-bit integral-plus-proportional term during a third system clock cycle group to generate the control signal.

7. A digital phase locked loop (DPLL) as in claim 6 wherein the control signal comprises components indicative of both the number of phase jumps to be taken by the multi-phase clock generator and the direction of the phase jumps.

8. A digital phase locked loop (DPLL) as in claim 6 wherein the pule density modulation accumulator means includes bandwidth control means responsive to an externally generated bandwidth control signal for varying the number of system clock cycles included in the third system clock cycle group.

9. A digital phase locked loop (DPLL) as in claim 6 wherein the proportional means comprises a proportional accumulator that includes an input register for stabilizing the multi-bit phase error signal and a divider responsive to the stabilized multi-bit phase error signal received from the input register for generating the current multi-bit proportional term.

10. A digital phase locked loop (DPLL) as in claim 9 wherein the integrator accumulator means comprises an integral term ledger storage means for storing a previously-calculated integral term and an adder for adding the current multi-bit proportional term and the previously-calculated integral term to generate the current integral term, the current integral term replacing the previously-calculated integral term stored in the integral term ledger storage means.

11. A digital phase locked loop (DPLL) as in claim 10 wherein the summing means comprises an integrator-plus-proportional ledger storage means for storing a previously-calculated integral-plus-proportional term and an adder for adding the current multi-bit proportional term and the current integral term to generate the current integral-plus-proportional term, the current integral-plus-proportional term replacing the previously-calculated integral-plus-proportional term in the integrator-plus-proportional ledger storage means.

12. A digital phase locked loop (DPLL) as in claim 11 wherein the pulse density modulation (PDM) accumulator means comprises a PDM accumulator ledger storage means for storing a previously-calculated PDM accumulator term and an adder for adding the current integral-plus-proportional term and the previously-calculated PDM accumulator term to generate the control signal and a current PDM accumulator term which replaced the previously-calculated PDM accumulated term in the PDM accumulator ledger storage means.

13. A digital phase locked loop (DPLL) as in claim 12 wherein the control signal comprises components indicative of both the number of phase jumps to be taken by the multi-phase clock generator and the direction of the phase jumps.

* * * * *